US008351090B2

(12) United States Patent
Makino

(10) Patent No.: US 8,351,090 B2
(45) Date of Patent: Jan. 8, 2013

(54) IMAGE PROCESSING APPARATUS, METHOD OF IMAGING PROCESSING AND STORAGE MEDIUM

(75) Inventor: Yoichiro Makino, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 12/544,171

(22) Filed: Aug. 19, 2009

(65) Prior Publication Data

US 2010/0046047 A1 Feb. 25, 2010

(30) Foreign Application Priority Data

Aug. 21, 2008 (JP) .................................. 2008-213363

(51) Int. Cl.
*H04N 1/04* (2006.01)

(52) U.S. Cl. ........ 358/474; 358/475; 358/509; 382/274; 382/275; 399/362

(58) Field of Classification Search .................. 358/474, 358/520, 518, 1.9, 526, 461, 475, 509; 382/274, 382/275; 399/362
See application file for complete search history.

(56) References Cited

U.S. PATENT DOCUMENTS

| | | | | |
|---|---|---|---|---|
| 4,711,554 A | * | 12/1987 | Nishimori | 399/52 |
| 4,873,552 A | * | 10/1989 | Otsuki | 399/143 |
| 5,001,768 A | * | 3/1991 | Mita et al. | 382/274 |
| 5,479,262 A | * | 12/1995 | Namiki et al. | 358/296 |
| 5,659,404 A | * | 8/1997 | Matsuda | 358/474 |
| 5,677,776 A | * | 10/1997 | Matsuda et al. | 358/475 |
| 5,689,348 A | * | 11/1997 | Takahashi et al. | 358/475 |
| 5,764,379 A | * | 6/1998 | Matsuda et al. | 358/474 |
| 6,330,050 B1 | | 12/2001 | Takahashi et al. | |
| 6,816,624 B1 | * | 11/2004 | Ebisawa et al. | 382/275 |
| 7,006,263 B2 | * | 2/2006 | Takahashi | 358/474 |
| 7,072,527 B1 | | 7/2006 | Nako | |
| 7,477,426 B2 | * | 1/2009 | Guan et al. | 358/474 |
| 7,602,995 B2 | * | 10/2009 | Araki et al. | 382/290 |
| 7,630,581 B2 | * | 12/2009 | Kojima et al. | 382/290 |
| 7,646,996 B2 | * | 1/2010 | Ariizumi | 399/49 |
| 2005/0219632 A1 | * | 10/2005 | Maki et al. | 358/3.26 |
| 2008/0024845 A1 | | 1/2008 | Makino | |
| 2009/0135453 A1 | * | 5/2009 | Wakisaka et al. | 358/474 |

FOREIGN PATENT DOCUMENTS

| | | |
|---|---|---|
| JP | 2005-115768 A | 4/2005 |
| JP | 2007-166431 A | 6/2007 |
| JP | 2008-054289 A | 3/2008 |

* cited by examiner

*Primary Examiner* — Negussie Worku
(74) *Attorney, Agent, or Firm* — Canon USA Inc IP Division

(57) ABSTRACT

An image processing apparatus determines a direction of document placement relative to a scanning direction based on a direction of a shadow region in an input image when a line sensor having a light receiving element performs a scan and an image read from a book document by a reading apparatus is input. When the direction of the binding portion of the document is determined to be along a longitudinal direction of the line sensor, an image of a region read by the light receiving element of the line sensor from reflected light undergoing specular reflection from the document is detected based on the amount of variation in luminance between adjacent pixels in the read image of the book document. Luminance of the image corresponding to the region is corrected.

8 Claims, 28 Drawing Sheets

INTERLINEAR NEIGHBORING CORRECTION AMOUNT
(X DIRECTION: MAIN SCANNING DIRECTION)

INTERLINEAR NEIGHBORING CORRECTION AMOUNT
(Y DIRECTION: SUB SCANNING DIRECTION)

INTERLINEAR NEIGHBORING CORRECTION AMOUNT
(X DIRECTION: MAIN SCANNING DIRECTION)

INTERLINEAR NEIGHBORING CORRECTION AMOUNT
(Y DIRECTION: SUB SCANNING DIRECTION)

INTERLINEAR NEIGHBORING CORRECTION AMOUNT
(X DIRECTION: MAIN SCANNING DIRECTION)

INTERLINEAR NEIGHBORING CORRECTION AMOUNT
(Y DIRECTION: SUB SCANNING DIRECTION)

FIG.12

COMPARATIVE EXAMPLE OF TWO SHADOW GRADATION PORTION CANDIDATES
USING INTERLINEAR CUMMULATIVE CORRECTION MAGNIFICATION

| | 1.0~1.2 | ~1.4 | ~1.6 | ~1.8 | ~2.0 | ~2.2 | ~2.4 | ~2.6 |
|---|---|---|---|---|---|---|---|---|
| SHADOW GRADATION PORTION CANDIDATE P (PROMINENT SHADOW) | 3 | <u>1</u> | <u>2</u> | 2 | <u>2</u> | <u>1</u> | <u>1</u> | <u>1</u> |
| SHADOW GRADATION PORTION CANDIDATE Q (NO CHANGE) | <u>4</u> | 0 | 0 | <u>3</u> | 1 | 0 | 0 | 0 |

LUMINANCE CORRECTION COEFFICIENT
TABLE WITH SPECULAR REFLECTION LIGHT
(LUMINANCE CORRECTION COEFFICIENT TABLE)

IMAGE PROCESSING APPARATUS, METHOD OF IMAGING PROCESSING AND STORAGE MEDIUM

BACKGROUND OF THE INVENTION

1. Field of the Invention

The present invention relates to a method of image processing by correcting read-out image data in an image reading apparatus such as an image scanner, copying machine or multifunction peripheral.

2. Description of the Related Art

When a saddle-stitch bound document such as a book or magazine is read or copied, the document surface is opened facedown and placed on a transparent document platen of an image scanner or copying machine and an image is read from below the document platen.

When reading an image in this orientation, the binding portion which is the section in proximity to the right and left borders of the opened pages of the document or the end (hereafter "front edge") of the stacked page leaves on both sides of the document surface may be separated from the platen. As a result, a shadow is produced on the binding portion or the front edge of the read-out image data and has an adverse effect on the quality of the output image. In particular, the image is darkened in proximity to the binding portion and when the darkened range includes letters, those letters are difficult to make out or read. This tendency becomes more pronounced when using thick documents.

when image data having the above features are printed, the problem of unnecessary consumption of toner or ink arises.

When the reading operation is performed to avoid the above problems by placing the binding portion of the copied document in close contact with the platen by applying pressure to prevent floating from the platen, damage to the copied document may result.

In this context, U.S. Pat. No. 6,330,050 discloses a method using imaging processing to correct a shadow in which, for example, an image correction apparatus estimates a three-dimensional shape of a book based on outer contour lines of the page in the read image.

U.S. Pat. No. 7,072,527 discloses a method of correcting a difference in the floating height from the platen between the top and bottom of the document binding portion resulting from the manner in which the document on the platen is pressured.

Japanese Patent Application Laid-Open No. 2005-115768 discloses a method of specifying the hue in background portions of the document in the document image data and applying a luminance correction to pixels which display a hue similar to the specified hue and are regarded as the background pixels.

U.S. Patent Application Publication No. 2008/0024845 discloses a method of suitable correction of luminance unevenness resulting from the shadow even when a document includes figures or photographs in background portions of the document or is printed in color. In this case, the figures or photographs are not modified for processing.

However, book documents, and in particular pages including high-quality photographs, may use paper with glossy characteristics (hereinafter referred to as "glossy paper"). Examples of glossy paper include catalogues or photographic magazines.

FIG. 24A is a sectional view seen in a direction from the top to the bottom of a book document 2401 which is opened and placed onto a document platen 2402.

The document surface has a planar portion 2410 and a curved portion 2411. The planar portion 2410 denotes a range other than the binding portion of the book document 2410 and is in close contact with the document platen 2402. The curved portion 2411 denotes the document surface going from the planar portion 2410 towards the binding portion of the right and left pages. The document surface is floating from the document platen 2402 and forms a curved face.

Since illumination light is weakened about the center of the floating range of the curved portion 2411, a shadow is produced in the binding portion.

An image reading apparatus reads a reflected document. Illumination light 2402 from a light source 2403 is irregularly reflected on the document surface and this diffused light 2406 becomes incident onto an image sensor 2405 such as a CCD sensor which then performs photoelectric conversion. Thus, an image reading apparatus acquires digital image data of the document. This configuration functions effectively for the planar portion 2410 where the document is in close contact with the document platen.

In the arrangement shown in FIG. 24A, since specular reflection light 2407, which is illumination light undergoing specular reflection on the document surface, is reflected in the direction of the solid arrow in FIG. 24A, the image sensor only receives diffuse light which corresponds to the document surface density.

However, since the document surface is curved near the binding portion of the book document 2401, the specular reflection light at the reading positions shown in FIG. 24B propagates more towards the image sensor 2405 than the light shown in FIG. 24A. The roughness of the document surface also has some effect on the signal output of the image sensor. In particular, the direction of the incident angle of illumination light and the direction of incident light on the image sensor are symmetrical at the reading position shown in FIG. 24C with respect to the perpendicular direction V of the document surface and illumination light undergoing specular reflection from the document surface becomes incident on the image sensor.

As described above, when a document surface is floating with a curvature, and in particular, when the document is glossy paper, a large amount of illumination light undergoes specular reflection, which is incident upon the image sensor, depending on the reading position. As a consequence, a brightness of the illumination light is higher than the document density and it becomes difficult to acquire image data of the original document.

In this context, Japanese Patent Application Laid-Open No. 2007-166431 discloses a technique of using image processing to correct a shadow on a binding portion thereby correcting luminance abnormalities resulting from specular reflection from glossy paper. This image processing apparatus models the effect of specular reflection light predicted from the floating of the document surface in the binding portion and the curvature of that surface. And a specular reflection component is corrected by subtracting the specular reflection component resulting from the curvature of the document surface, from the reading image data. More precisely, the processing apparatus uses a ratio fixed by the model to extend a specular reflection range predicted in the neighborhood, based on a width of the dark binding portion that does not produce specular reflection.

However, the characteristics of surface reflection from glossy paper are various and many documents do not use glossy paper. Therefore, a uniform treatment of the effect of specular reflection is not determined. Furthermore, there are clearly large differences in the curvature of the document surface at the binding portion, which depend on the thickness or binding way of the bound document, whether the open page is near the cover page of the bound document or whether it is in the middle of the total number of pages. Therefore an undesirable correction may be caused if a range for specular reflection correction is estimated from only the range of the shadow in the binding portion.

Further, in the above method, a low luminance range exceeding a predetermined threshold when compared to the document background luminance of a planar portion, is considered to be the range of the shadow in the binding portion. However, this method is limited to documents in which the background of the document is a uniform white or pale density. For example, since the background of a document surface containing a plurality of photographs may not have a uniform white or pale density, in such a case, application of this method is not sufficiently effective. This is a practical obstacle because photographs are often printed in glossy pages that tend to produce specular reflection.

In other words, current techniques may result in performing undesirable corrections depending on contents of the bound document, the type of paper or the method of placement.

SUMMARY OF THE INVENTION

The present invention is directed to an image processing method enabling suitable correction of a high luminance component of a read image which is produced by incident light resulting from specular reflection when a book document is placed and read on a platen.

According to an aspect of the present invention, an image processing apparatus includes an input unit, a determination unit and a correction unit. The input unit scans with a line sensor having a light receiving element which receives light reflected from a document and inputs a document image from a reading apparatus which reads the book document by the scanning. The determination unit determines a direction of the document placement relative to the scanning direction of the line sensor. The correction unit detects a region of reflected light caused by specular reflection which is read by the light receiving element, from the document read from the book document, based on the luminance value of pixels in the document image when the direction of the binding portion of the book document is determined to be along a longitudinal direction of the line sensor based on the determination result by the determination unit, and corrects a luminance of an image corresponding to the detected region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates an example of comparative processing of shadow gradation portions using interlinear accumulative correction magnification.

DETAILED DESCRIPTION OF THE EMBODIMENTS

Various exemplary embodiments, features, and aspects of the invention will be described in detail below with reference to the drawings.

Figure 1:
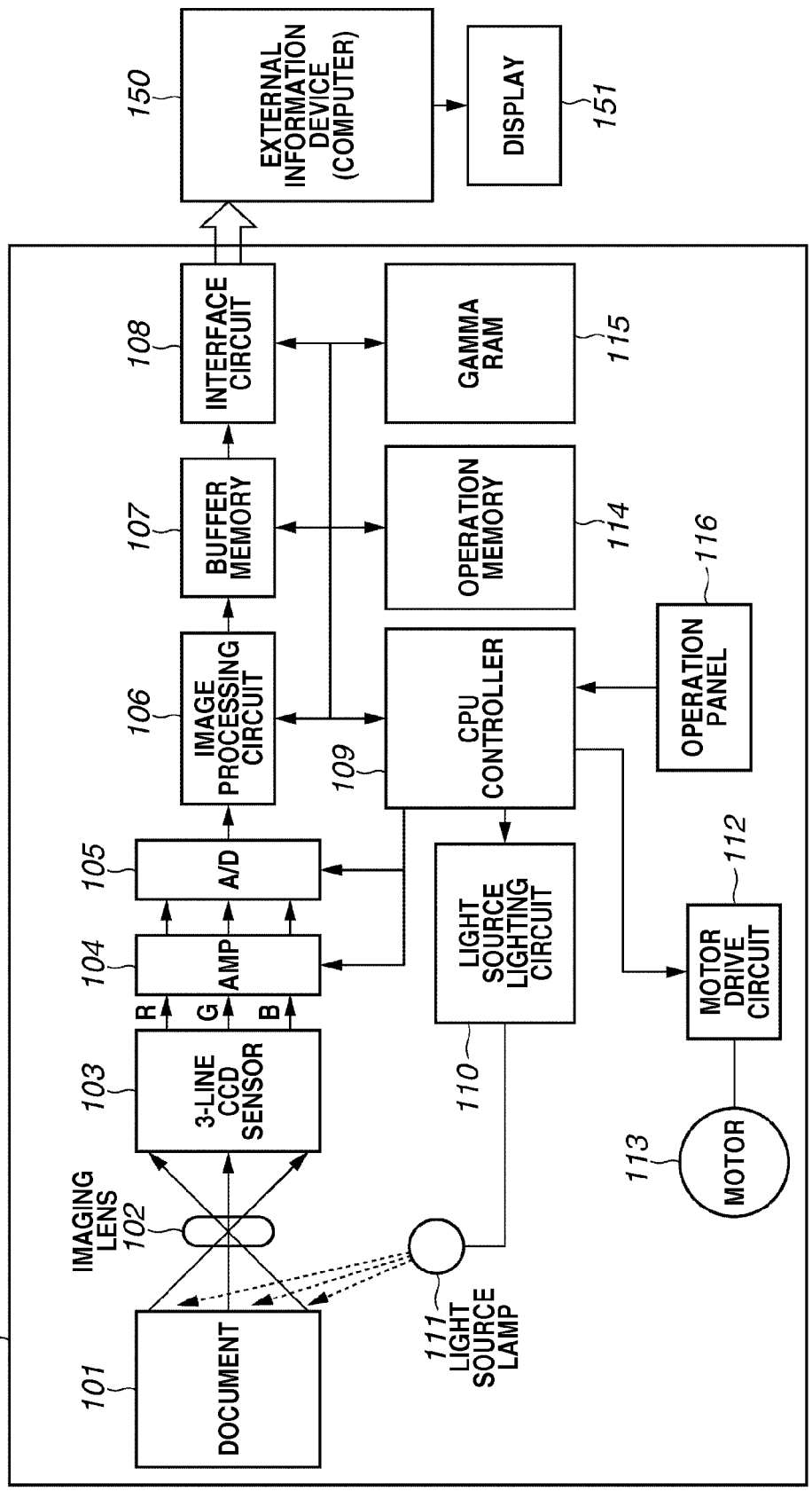
FIG. 1 is block diagram illustrating the configuration of an image reading apparatus and an external information device according to a first exemplary embodiment of the present invention.

FIG. 1 is block diagram showing the structure of an image reading apparatus 100 and an external information device according to a first exemplary embodiment of the present invention.

The image reading apparatus 100 is an example of an imaging processing apparatus. A light source lamp 111 illuminates the read document 101 and reflected light having a strength proportional to the density of the document surface is formed via an imaging lens on a 3-line CCD sensor 103 such as a CCD sensor which is a solid-state imaging sensing device.

A light source lighting circuit 110 drives and illuminates the light source lamp 111. An amplifier 104 amplifies an analogue image signal output from the 3-line CCD sensor 103. A motor drive circuit 112 is a motor drive circuit for driving an optical system driving motor 113 such as a stepper motor and outputs excitation signals for the optical system drive motor 113 in response to control signals from a central processing unit (CPU) controller 109. The CPU controller 109 is a system control means for the image reading apparatus 100.

An analog/digital (A/D) converter 105 converts analog image signals outputted from the amplifier 104 into digital image signals. An image processing circuit 106 performs imaging processing on digitalized image signals. The image processing includes off-set correction, shading correction, digital gain adjustment, color balance adjustment, color masking conversion and resolution conversion in the main scanning direction or sub scanning direction. A buffer memory 107 is configured by a RAM and temporarily stores image data.

An interface circuit 108 mediates the transmission of images or commands with an external information device 150 and is an interface such as a small computer system interface (SCSI), Parallel, universal serial bus (USB) or IEEE1394. An operation memory 114 is a temporary operation memory when an image processing circuit performs image processing. The operation memory 114 has a predetermined offset on the 3-line CCD sensor 103 and is used for correction of red/green/blue (RGB) interlinear offset in image signals from RGB line sensors disposed in parallel. The operation memory 114 temporarily stores various data including shading correction.

A gamma RAM 115 stores a gamma look up table (LUT) which is an LUT for storing a luminance gamma conversion LUT and performing gamma correction.

The CPU controller 109 controls the image reading apparatus 100 in response to commands from the external information device 150 and controls units such as the motor drive circuit 112, the light source lighting circuit 110 and the image processing circuit 106. The state of a switch provided on an operation panel 116 is detected by the CPU controller 109 and notified via the interface to the external information device 150.

The external information device 150 is a host computer such as a personal computer and is connected with a monitor display 151.

The image reading apparatus 100 uses the 3-line CCD sensor 103 and the light source lamp 11 for reading of the three RGB colors. However, the same function can also be realized by using a contact image sensor (CIS) including a one line image sensor and the light sources of the three RGB colors which can be turned ON and OFF.

Figure 2:
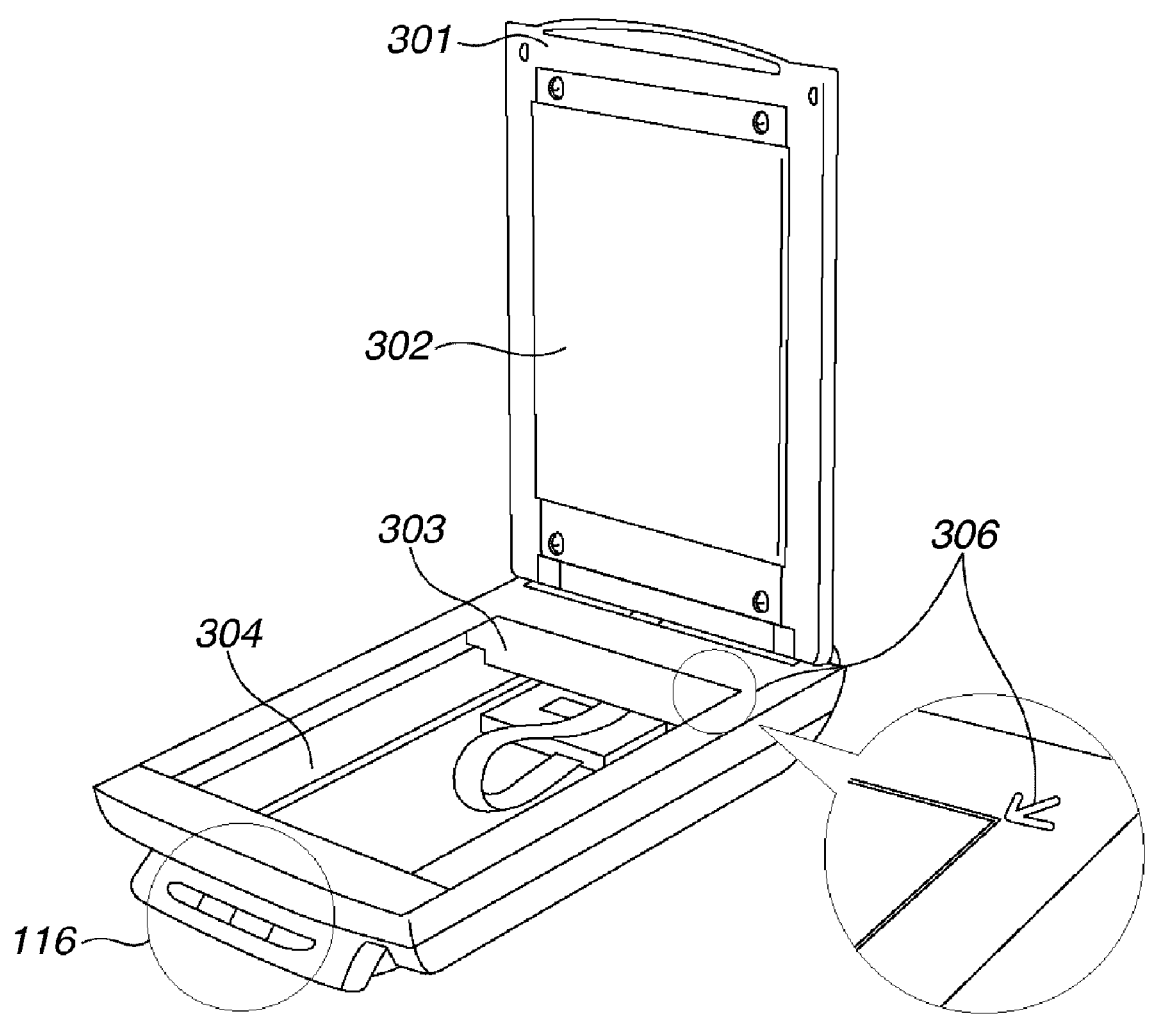
FIG. 2 illustrates the outer appearance of the image reading apparatus.

FIG. 2 illustrates the outer appearance of the image reading apparatus 100.

A document pressing plate 301 presses a document in a stable manner onto a platen. A white sheet 302 places a thin sheet document into close contact with the platen and turns the image data of the margin portion of the document into a white color.

An optical reading unit 303 is provided. The platen 304 maintains the document reading face in a planar orientation and retains the document. The operation panel 116 transmits simple commands such as initiation of reading to the external information device 150 which is the destination for image data transmission. A reference mark 306 is a mark showing a document reference position and shows the reading start position for a document placed on the platen.

Next the reading operation of a document image by the image reading apparatus 100 will be described.

The CPU controller 109 of the image reading apparatus initializes the circuits shown in FIG. 1 when receiving a reading command from the external information device 150. Thereafter, the optical system drive motor 113 is operated and rotated to move the optical reading unit 303 through a drive belt in a sub scanning direction.

The CPU controller 109 of the image reading apparatus in synchronization with this moving operation causes the 3-line CCD sensor 103 and the A/D converter 105 to convert luminance information into a digital electrical signal. The luminance information comes from the document surface immediately above the optical unit illuminated by the light source lamp 111. The image processing circuit 106 transforms the luminance and resolution of image signals converted to digital electrical signals and transmits the transformed data to the external information device 150 through the interface circuit 108. The external information device 150 stores image data of the document read on the platen and performs image processing as described hereafter.

The shadow luminance correction process is performed when an image darkens due to floating of the binding portion and the front edge of a saddle-stitched book document from the platen 304. Next, this process will be described in detail.

In addition, a process will be described in which when specular reflection is produced in proximity to a shadow on a curved document surface floating from the platen, a range of brightness is detected in a range adjacent to the shadow, and continuous correction is performed on the luminance variation between the shadow range and the adjacent specular reflection range.

This process is performed when a user indicates that a document is a saddle-bound book document. In the first exemplary embodiment, the external information device 150 processes an image read by the image reading apparatus 100.

Figure 3A:
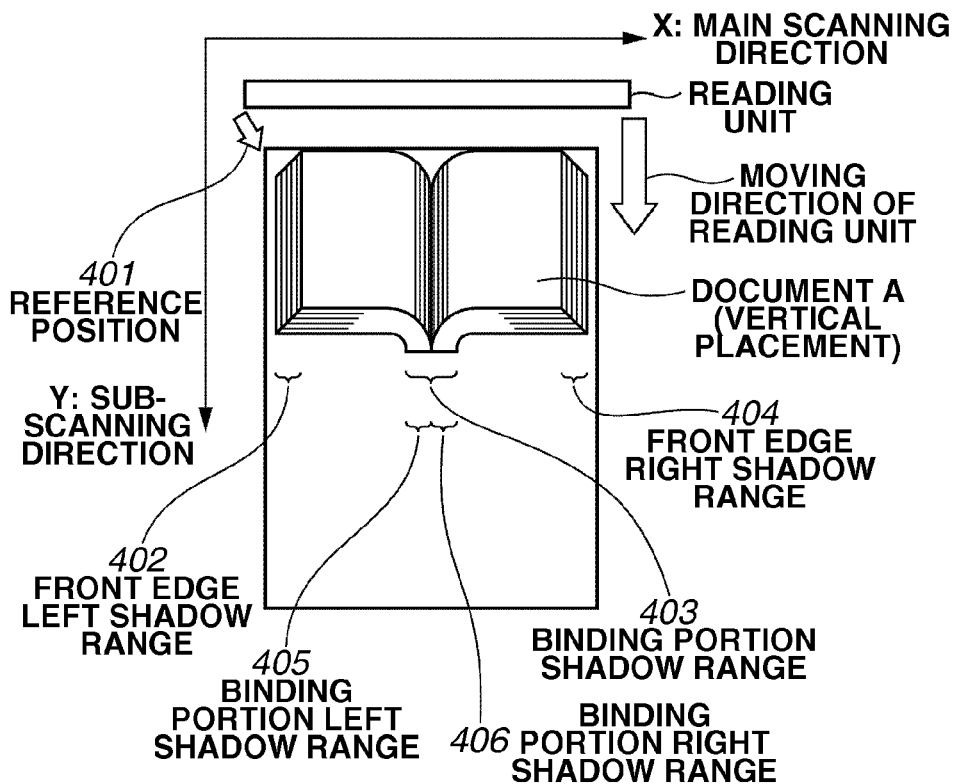
FIGS. 3A and B illustrate the direction of placement when a saddle-stitched book document is placed on a document platen of an image reading apparatus.

FIGS. 3A and B illustrate the direction of placement when a saddle-stitched book document is placed on a document platen of an image reading apparatus.

FIG. 3A illustrates the situation in which the binding portion or the front edge of the document is positioned along a sub scanning direction which is the direction of motion of the optical reading unit. This method of placement is termed "vertical placement".

A binding portion shadow range 403 is a shadow produced by floating of the binding portion from the platen near a boundary between the right and left pages of a document placed face-down. The range 403 includes a binding portion shadow range 405 on the left and a binding portion shadow range 406 on the right.

The front edge left shadow range 402 and the front edge right shadow range 404 are both the ends of the document surface, and the end (front edge) of the stacked page leaves is the range of the shadow produced by floating from the platen.

Figure 3B:
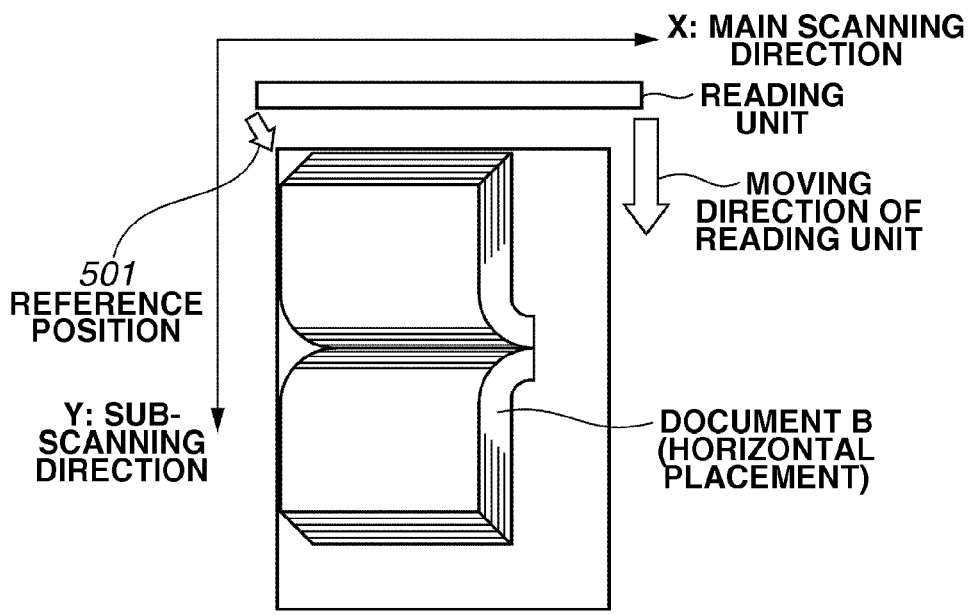

FIG. 3B illustrates the binding portion or front edge placed along the main scanning direction which is the direction of motion of the image reading sensor. This method of placement is termed "horizontal placement".

These figures illustrate the characteristics of the image direction formed on a reading sensor and schematically illustrate an image as seen from a lower face of the platen 304 in FIG. 2, that is, from inside the housing. The reference positions 401, 501 shown in FIGS. 3A and 3B correspond to the reference mark 306 shown in FIG. 2.

Figure 4:
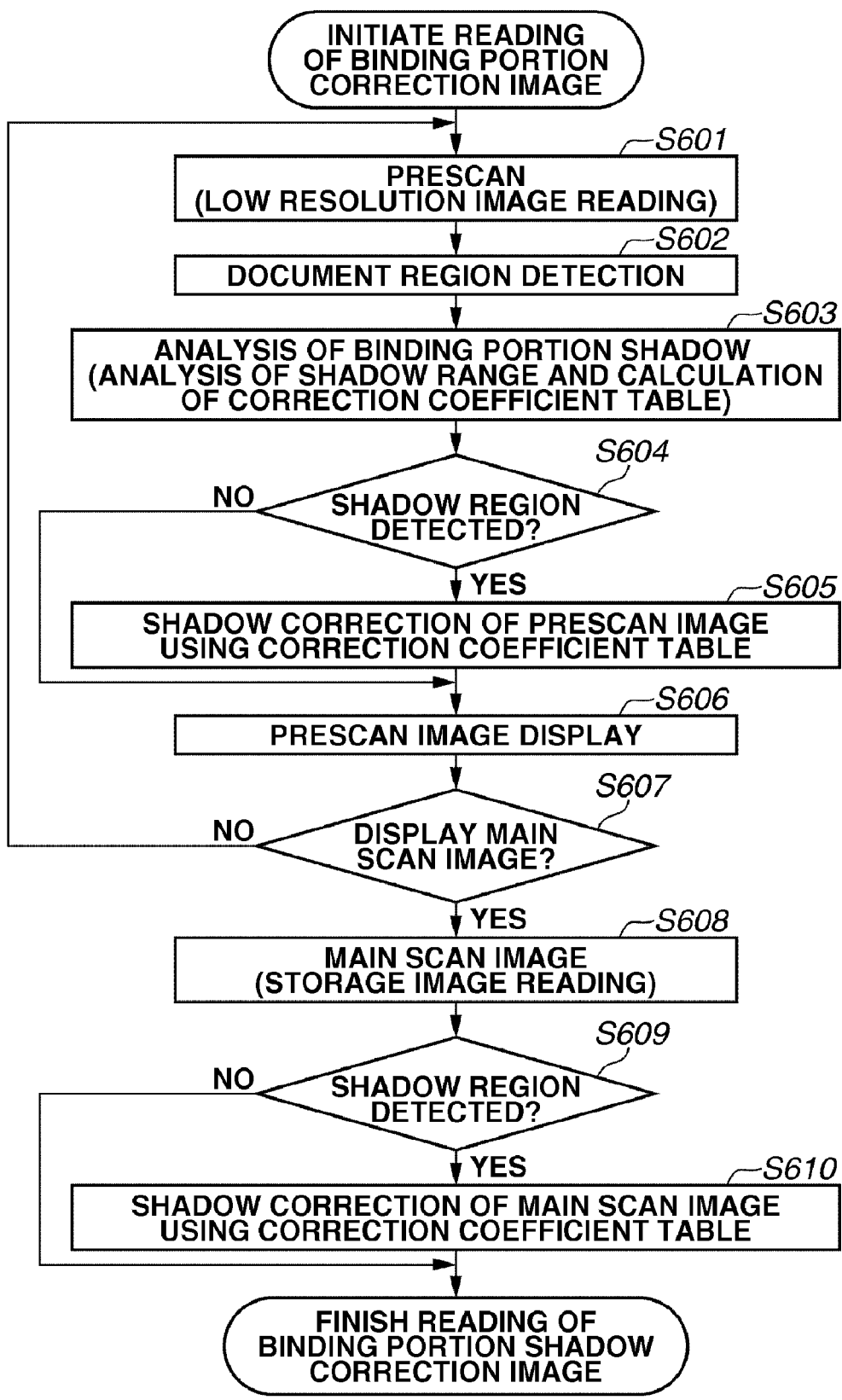
FIG. 4 is a flowchart showing the operation of acquiring a luminance-corrected image of a front edge or a binding portion shadow of a saddle-stitched book document.

FIG. 4 is a flowchart showing the operation of acquiring a luminance-corrected image of a front edge or a binding portion shadow of a saddle-stitched book document.

The program stored in the memory device (not shown) of the external information device 150 acquires a corrected image of the binding portion shadow according to the following steps.

Firstly, in step S601, the external information device 150 issues a command to the image reading apparatus 100 to read an image of the entire platen surface at a relatively low resolution and receives the read image. The image serves as a pre-scanned image used in shadow range analysis of the binding portion or in detecting the document range on the platen. In the present specification, the image is termed the "pre-scan image".

In step S602, the pre-scan is analyzed to specify a document range on the platen. Many conventional techniques are currently used to specify a document range and detailed description thereof is omitted in this specification. Then, in step S603, detection of the binding portion shadow and the front edge shadow is performed within the document range detected in step S602 and a shadow luminance correction coefficient table is calculated. Details of the detection of the shadow range and the calculation of the shadow luminance correction coefficient table are described below. In step S604, the results of step S603 are used to determine whether a binding portion or front edge shadow is detected. When a binding portion shadow or front edge shadow requiring luminance correction is detected, in step S605, the shadow luminance correction coefficient table generated in step S603 is used to correct the luminance of the shadow within the shadow range of the pre-scan image. In step S606, the pre-scan image after binding portion shadow correction is displayed on the monitor display 151, which is connected to the external information device 150.

When a user determines that suitable correction results have been acquired for the image displayed on the display image, a command to perform main scanning may be input. When the command is input, in step S607, the external information device 150 issues a command to read to the image reading apparatus 100 at the target resolution and in the target document range. In step S608, the image reading apparatus 100 reads the document image and transmits the data to the external information device 150 in accordance with designated reading conditions such as the level of resolution or the like. This image is the image for the purpose of storage and, in the present specification, is termed a "main scan image".

In step S609, the external information device 150 determines whether a binding portion shadow correction is required in response to the analysis result of the pre-scan image. When a shadow luminance correction is necessary, in step S610, the resolution in the shadow luminance correction coefficient table obtained by analysis of the pre-scan image is converted. The converted table is applied to the binding portion shadow range 403, the front edge left shadow range 402 and the front edge right shadow range 404, on the main scan image. Thus, a target image is acquired.

Figure 11:
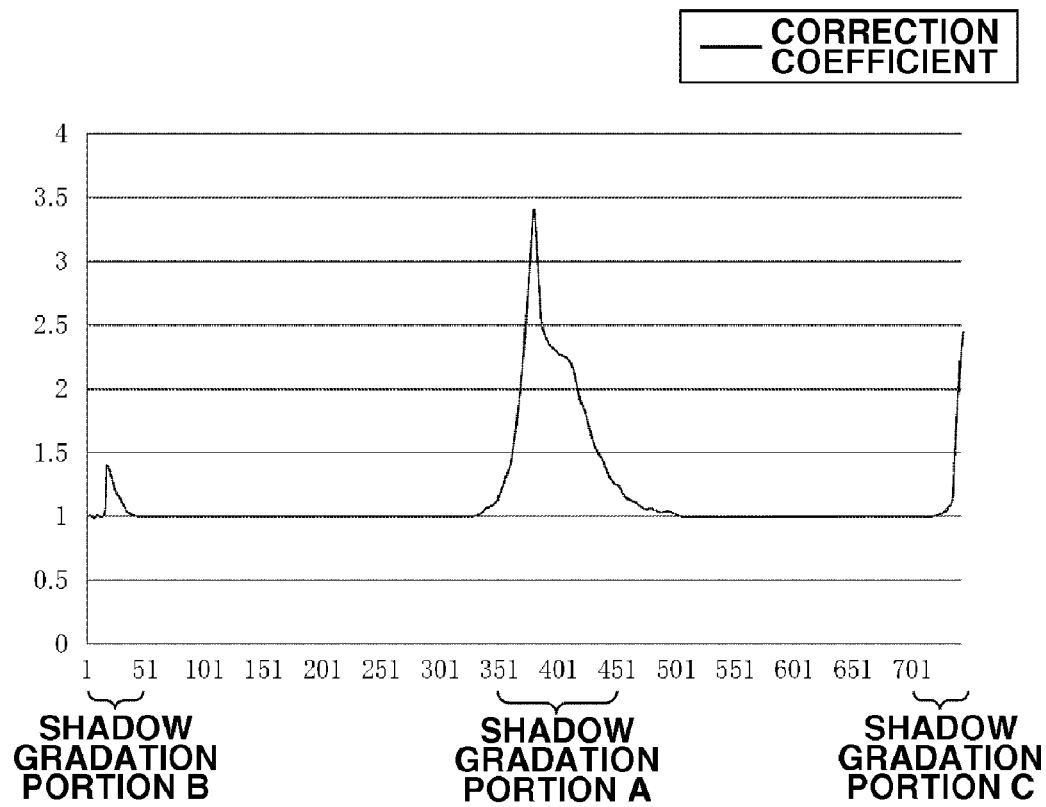
FIG. 11 illustrates an example of a shadow luminance correction coefficient table (luminance correction magnification table) based on analysis of a pre-scanned image.

FIG. 11 illustrates an example of a shadow luminance correction coefficient table (luminance correction magnification table) based on analysis of a pre-scanned image.

The example shown in FIG. 11 illustrates a shadow luminance correction coefficient applied to the saddle-stitch book document placed as shown in FIG. 3B. The horizontal axis of the graph shows a sub scan pixel position in the pre-scan image having a resolution of 75 dpi and the vertical axis shows a shadow luminance correction coefficient for each pixel position.

For example, the shadow due to the saddle-stitched section is present mainly from the $350^{th}$ pixel to $450^{th}$ pixel and a correction is applied to a region in proximity to the binding portion to increase the luminance value by approximately 3.3 times. The luminance correction increases the luminance which was reduced by the shadow and brightens the image in the saddle-stitched portion.

This correction is applied to all pixels related to the saddle-stitched section irrespective of whether the pixels are background pixels, letter pixels or the background section of letters. Furthermore, when correcting a main scan image of a different resolution, the required correction coefficient for the pixel position is acquired by interpolation from the correction coefficient table in order to correct the luminance of the shadow portion.

Next, the analysis of the binding portion shadow (S603), the detection of the front edge shadow and the calculation process of shadow luminance correction coefficient will be described with reference to the read document image disposed as shown FIG. 3B.

Figure 5:
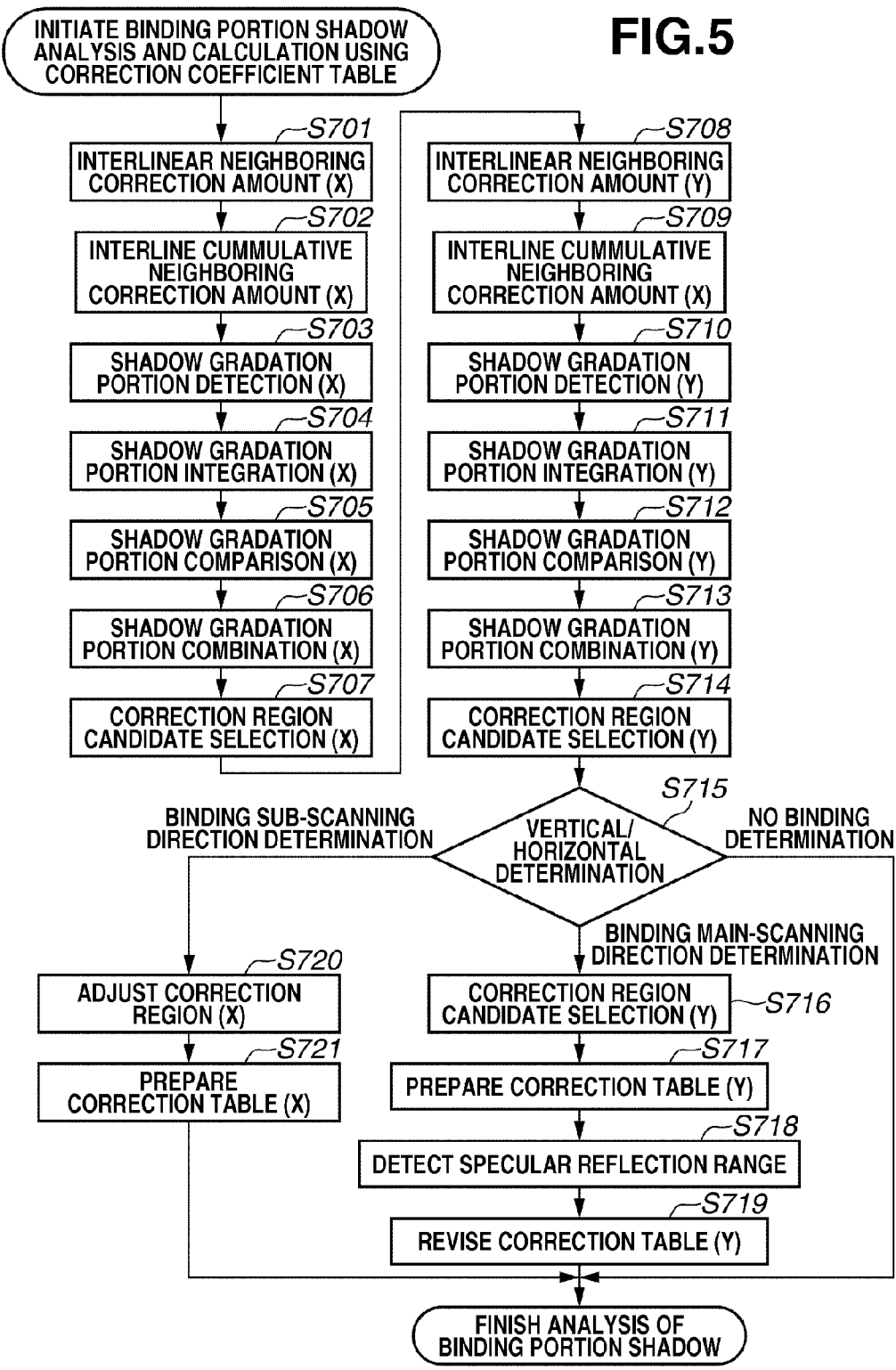
FIG. 5 is a flowchart describing an analysis processing on the binding portion shadow.

FIG. 5 is a flowchart describing analysis processing for the binding portion shadow.

Firstly in step S701, an interlinear neighboring correction value (for details, refer to FIG. 6) is calculated with respect to a main scanning direction. The image is configured of lines in the sub scanning direction which extend successively and adjacently in a main scanning direction. Then, a correction value $cr(i)$ is calculated which minimizes the luminance difference between the average luminance of background pixels on the target line, and an average luminance of background pixels on the neighboring line on the right side. Each pixel on each target line is corrected by brightening or adjusted by darkening.

In other words, the correction value $cr(i)$ is a value c which minimizes the value $Dr(i)$ in Formula 1 below. $Dr(i)$ is an integrated value related to a variable j which shows the pixel position in a sub scanning direction.

$$Dr(i)=\Sigma abs(P(i,j)-P(i+1,j)\times(256+c)/256) \quad (1)$$

P(i, j) is a luminance value for the i-th pixel in the main scanning direction and the j-th pixel in the sub scanning direction and is expressed as a binary 8-bit number. abs( ) is an absolute value function. When the target line P(i, *) is dark, the correction value is a positive value, and when bright, the correction value is a negative value.

Next, the calculation of the interlinear neighboring correction value for the main scanning direction in step S701 will be described in detail.

Figure 6:
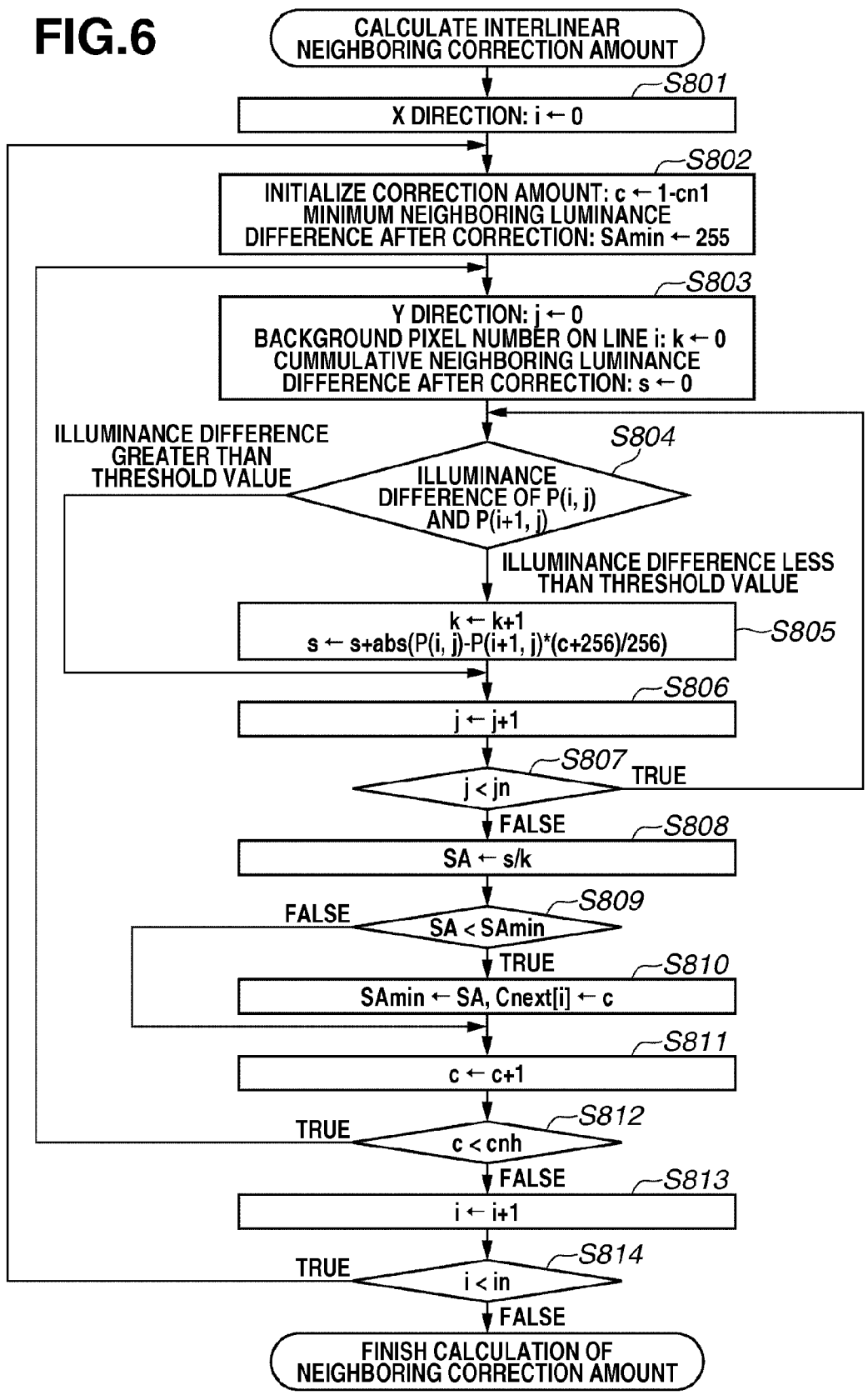
FIG. 6 is a flowchart illustrating a process of calculating an interlinear neighboring correction value.

FIG. 6 is a flowchart illustrating a process of calculating an interlinear neighboring correction value.

The process of calculating an interlinear neighboring correction value as shown in FIG. 6 is an example of a process of determining whether the direction of the binding portion is along the linear illumination lamp or the illumination light guide.

In FIG. 6, i is a variable expressing pixel position in an X direction (main scanning direction) and j is a variable expressing pixel position in a Y direction (sub scanning direction).

The process shown in FIG. 6 uses the luminance variation in the X direction produced by the binding portion along the Y direction to calculate a neighboring correction value Cnext [i] for the pixel position i.

In steps S801, S813 and S814, the neighboring correction value Cnext[i] is calculated for the respective pixel positions in the X direction. In step 802, a minimum value (1−cnl) is set as an initial value for the neighboring correction value coefficient c to calculate the neighboring correction value for a pixel position i. A sufficiently large value is set as a minimum variable SAmin of the luminance difference between neighboring pixels obtained by the correction variable c up until that point.

Next, an average value is calculated for the luminance correction result for background pixels on the line corresponding to the pixel position i using the correction variable c. In step S803, the calculation is initialized at a position j in the Y direction. In step S804, when the luminance difference from the neighboring pixel at the position j is greater than or equal to a predetermined threshold value, the pixel at the position j is determined to be a letter or line contour pixel and is omitted from the correction calculation.

The threshold for determination of contour pixels or background pixels using luminance may, for example, takes a value of 25. However, since the threshold value varies in response to smoothing processing on the pre-scan image or the optical characteristics of the image reading apparatus 100, an effective value is empirically calculated for the image reading apparatus 100. The effective value is applied to a plurality of images containing images blurred as a result of document floating from the platen.

A pixel is designated as a background pixel when the luminance difference is less than the threshold value and a value of 1 is added to the background pixel number k on the line corresponding to the pixel position i. The luminance value P(i+1, j) for pixels neighboring the target pixel is calculated as the difference of the luminance P(i+1, j)×(256+c)/ 256 corrected with the correction value c and the luminance value P(i+1, j) for the target pixel. In step S805, the absolute value for this difference is added to the neighboring luminance difference cumulative variable s.

In steps S806 and S807, the process in steps S804 and S805 is repeated for all pixel positions j. Thereafter in step S808, an average value SA is calculated for the neighboring luminance difference using the correction value c. In step S809, the average value SA is compared with a minimum value SAmin for the neighboring luminance difference average at that point. If the minimum value SA for the neighboring luminance difference is smaller, in step S810, the minimum value SA for the neighboring luminance difference at that point and the correction variable c are stored as optimal correction candidates.

The process in the steps S803-S810 is repeated until the correction variable c equals the predetermined maximum value (cnh−1) for the neighboring correction value to obtain a neighboring correction value Cnext[i] for the pixel position i.

The value cnl referred to in step S802 and the value cnh referred to in step S812 are the values determining the range to be acquired for the neighboring correction variable c. These values are empirically determined values based on the results of applying this process to a plurality of images having binding portions. More precisely, when cnl=128 and cnh=256, an optimal neighboring correction value can be selected from a range in which the luminance of neighboring lines is approximately ½ or 2 times.

If the pre-scan image in shadow detection and analysis has a high resolution, since the density variation between neighboring lines is small, the absolute values for cnl and cnh may be reduced. In other words, further improved results in the read-out image can be obtained by switching the values cnl and cnh in each resolution range of the pre-scan image.

The neighboring correction value cr(i) for the pixel position i obtained in this manner is a correction values which corrects the luminance for neighboring pixels on the right side of the target pixel position to be the luminance of the pixel at the target pixel position. In the same manner, a neighboring correction value cl(i) is calculated which corrects the luminance for neighboring pixels on the left side of the target pixel position to be the luminance of the pixel at the target pixel position. In other words, the neighboring correction value cl(i) is a value setting Dl(i) to a minimum value, wherein Dl(i) is an integrated value related to the pixel position j in Formula 2 below.

$$Dl(i)=\Sigma abs(P(i,j)-P(i-1,j)\times(256+c)/256) \quad (2)$$

Figure 8A:
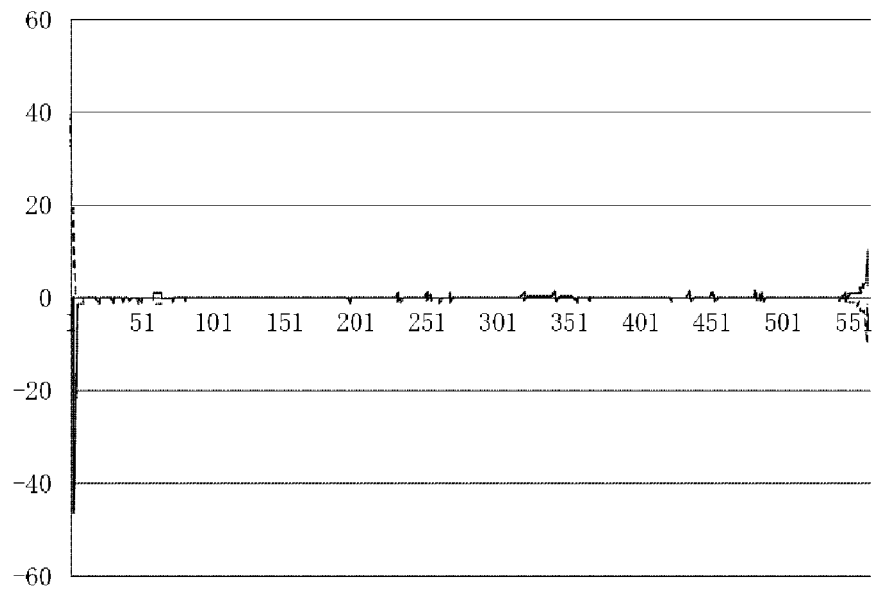
FIGS. 8A and B are graphs illustrating an example of an interlinear neighboring correction value with respect to a main scanning direction and a sub scanning direction.
Figure 8B:
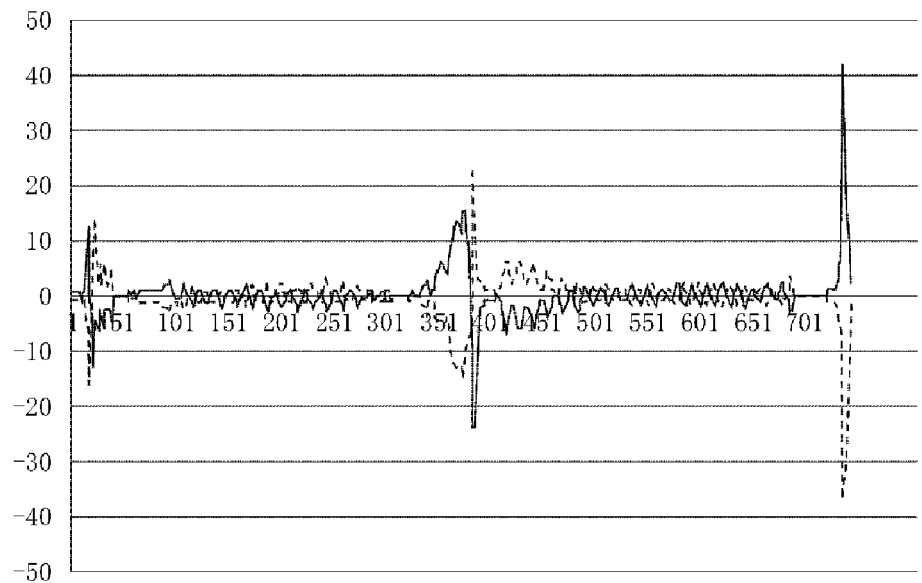

FIG. 8A is a graph illustrating an example of the results obtained in step S701.

The horizontal axis in FIG. 8A shows the pixel position in the main scanning direction corresponding to a pixel position i. The solid line illustrates the neighboring correction value cr(i) and the broken line illustrates the neighboring correction value cl(i).

Next, in step S702, an interlinear cumulative correction value (X) is calculated. Firstly, the neighboring correction values cr(i) and cl(i) are used to calculate an interlinear neighboring correction magnifications ar(i) and al(i). Then, integrated interlinear cumulative correction magnifications sr(i) and sl(i) are calculated by successively integrating neighboring correction magnifications between neighboring lines at line positions at which the correction value sign is the same, until the correction value sign changes. N denotes the total number of lines.

The neighboring correction magnification (from left to right) for i=0, 1, 2, . . . N−1:

$$ar(i)=(256+cr(i))/256 \quad (3)$$

The neighboring correction magnification (from right to left) for i=N−1, N−2, . . . 2, 1, 0:

$$al(i)=(256+cl(i))/256 \quad (4)$$

The cumulative correction magnification (from left to right) for i=0, 1, 2, ... N−1:

$$((cr(i-1) \times cr(i)) \leq 0)$$

then $sr(i)=ar(i)$ else $sr(i)=sr(i-1) \times ar(i)$ (5)

The cumulative correction magnification (from right to left) for i=N−2, N−3, ... 2, 1, 0:

if $((cl(i+1) \times cl(i)) \leq 0)$ then $sl(i)=al(i)$ else $sl(i)=sl(i+1) \times al(i)$ (6)

Figure 9A:
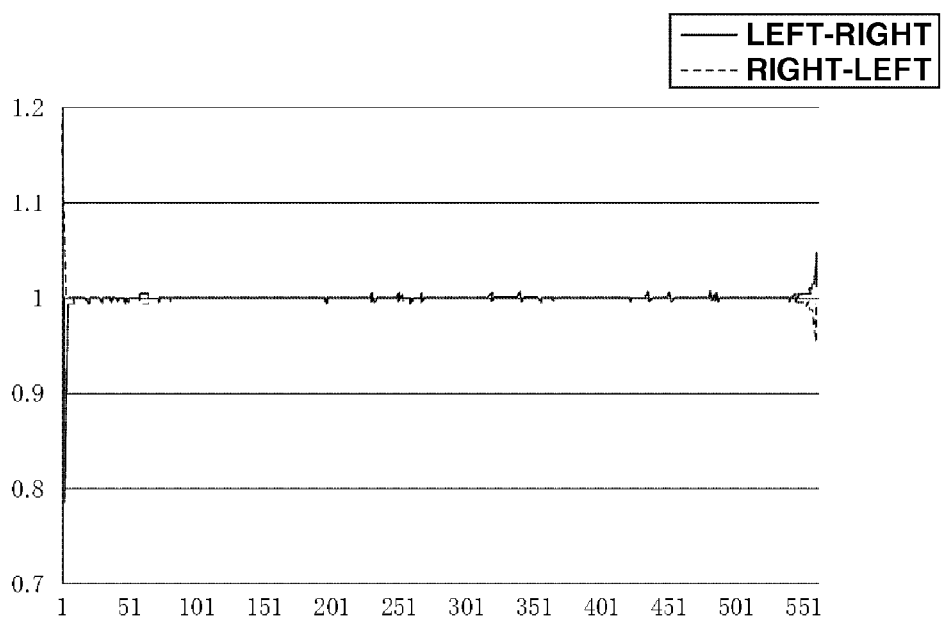
FIGS. 9A and B are graphs illustrating an example of an interlinear neighboring correction magnification with respect to the main scanning direction and the sub scanning direction.
Figure 9B:
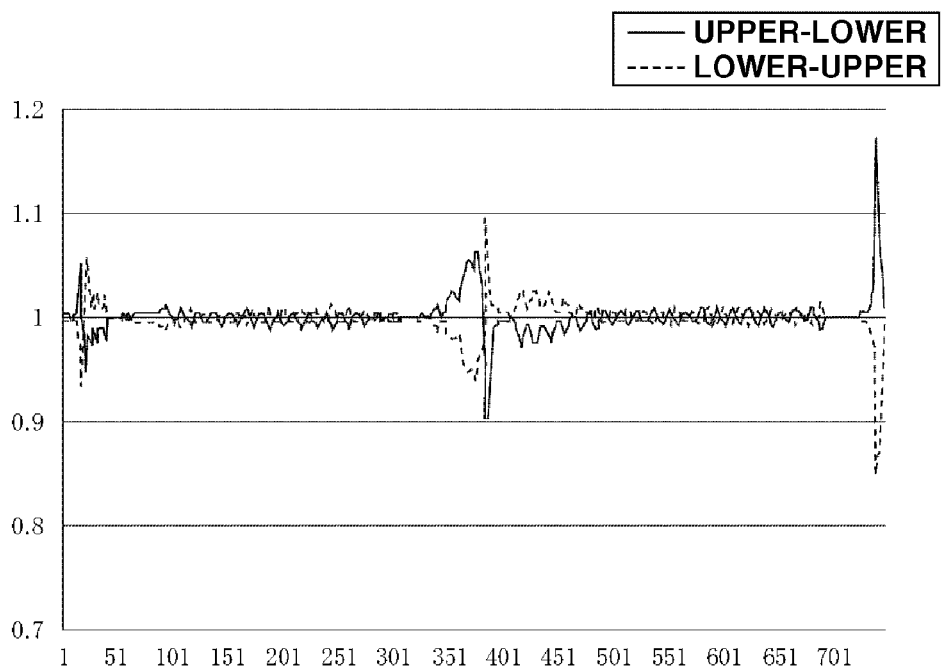
Figure 10A:
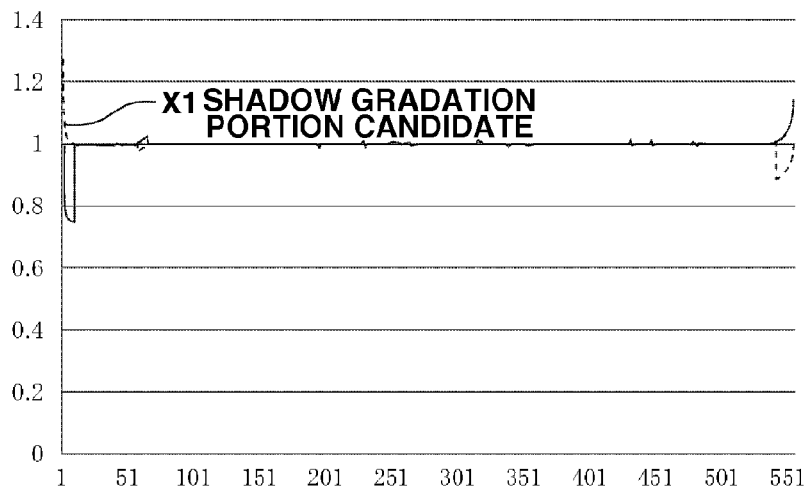
FIGS. 10A and B are graphs illustrating an example of an interlinear cumulative correction magnification with respect to the main scanning direction and the sub scanning direction.

FIG. 9A illustrates neighboring correction magnification calculated using the neighboring correction value shown in FIG. 8A. FIG. 10A illustrates the cumulative correction magnification.

In this manner, after the cumulative correction magnification is calculated in step S702, candidates for binding portion shadow and front edge shadow are detected using the cumulative correction magnification. In step S703, positions at which the extreme value for the cumulative correction magnification has a value greater than or equal to a predetermined threshold value are searched and then a range which is continuously greater than or equal to the threshold value is identified as a shadow gradation portion candidate.

The threshold value is a value of, for example, 1.2, which will not cause erroneous detection of uneven shading on the paper surface. However, since unclear letter contours cause localized errors in the cumulative correction magnification and there are gradation variations due to shadowing, the shadow gradation portion candidates may be split into two. Accordingly, in step S704, positions are searched where the interval between two shadow gradation portion candidates is less than or equal to a predetermined value, and an extreme value of the cumulative correction magnification for the two candidates which are treated as continuous is updated. As a result, if the value is larger than the separate extreme values, two shadow gradation portion candidates are treated as one candidate.

Although an interval in which adjacent shadow gradation portion candidates are treated as continuous depends on the image resolution and the blurring of the reading optical system, for example, a value of 6 is used for 75 dpi images. Then, the cumulative correction magnification is re-calculated. However, when there is a portion in which the cumulative correction magnification takes a value of less than 1 in two shadow gradation portion candidates, the processing in step S704 is not performed. Since a cumulative correction magnification calculated towards the right is separately dealt from a cumulative correction magnification calculated towards the left, the binding portion shadow has two shadow gradation portion candidates right and left across the binding portion.

In step S705, if a plurality of candidates is detected by searching for shadow gradation portion candidates, a priority and order is assigned to each candidate. In FIG. 12, when assigning an order, a number of lines where a cumulative correction magnification is included in a threshold of a certain interval, is calculated for each shadow gradation portion candidate. A value for threshold intervals of 0.2 is used in the comparative example shown in FIG. 12.

In the comparative example shown in FIG. 12, the frame of a single threshold interval for each shadow gradation portion candidate is termed a "cell". The shadow gradation portion candidate P on the upper row in FIG. 12 will be described.

Figure 10B:
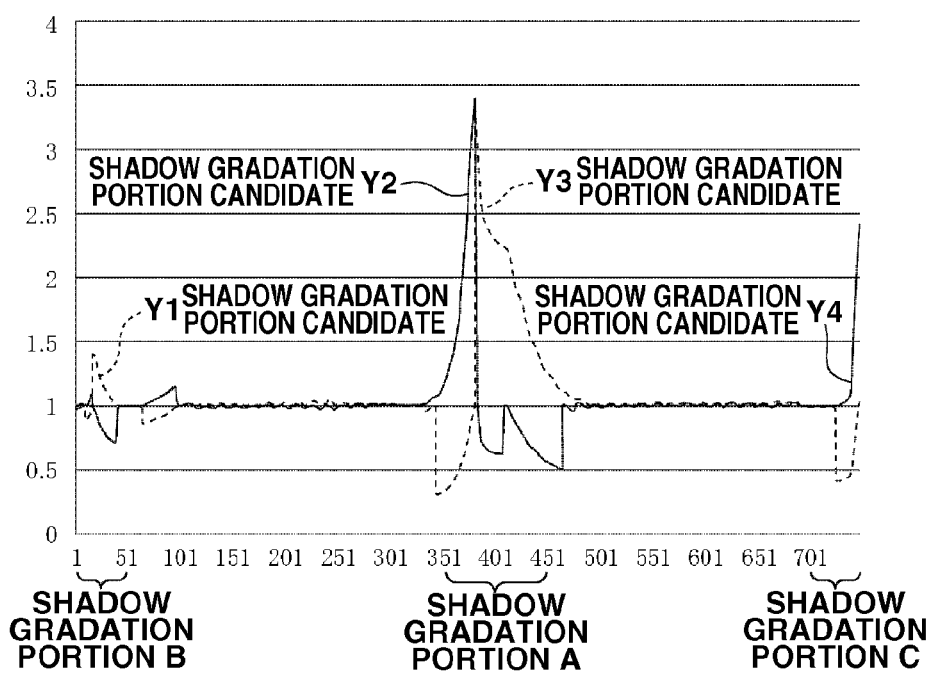

The shadow gradation portion candidate P, similar to the shadow gradation portion candidate Y2 shown in FIG. 10B, is a shadow in which the luminance shows a large gradual reduction. The cumulative correction magnification for the shadow gradation portion candidate P varies from 1.0 to 1.2 in three lines (the left-most cell). Then, each cell on the upper line of the table shows a variation in one line in a cell of 1.2 to 1.4 and in two lines in a cell of 1.4 to 1.6.

In the same manner, the row of cells on the lower line in FIG. 12 shows variation in the cumulative correction magnification for the correction gradation candidate Q and corresponds to the variation in the gradation produced by factors other than the shadow. Although there is a variation of 4 lines of from 1.0 to 1.2, due to rapid stepwise change, there are no lines from 1.2 to 1.6. Although there is a variation of 3 lines of from 1.6 to 1.8, the cell up to 2.0 has the maximum cumulative correction magnification.

Thus, the number of lines until the cumulative correction magnification varies through a fixed interval is sequentially calculated and incorporated into a table with cell values which have the following characteristics (1), (2), (3). In other words, the characteristics determining a luminance correction for a shadow due to a reduction in luminance are reflected in the cell values as shown below.

(1) Since a large cumulative correction magnification is produced by dense shadows, the value is input until the cell on the right side of the table.

(2) Since the cumulative correction magnification shows gradual variation when the shadow gradually becomes dark due to the floating of the document from the platen, there are few blank cells until the right-most cell.

(3) Even when the values for maximum cumulative correction magnification are the same, since many lines vary due to the changes in the threshold intervals caused by broad shadows, the respective cell values become larger.

Thus, the characteristics of shadow gradation portion candidates for correcting luminance on the basis of shadow can be expressed by large values input into more cells. In this manner, the characteristics of shadow gradation portion candidates are shown by the value in each cell. Thus, when comparing the priority of two shadow gradation portion candidates, cell values for each threshold interval are compared and the shadow gradation portion candidate with a large value in a higher number of cells is determined as the candidate with the higher priority.

More precisely, in FIG. 12, the cells in which values are underlined by a solid line are the larger values. Thus, candidate P has six cells in which the values are underlined by a solid line in contrast to candidate Q which has only two cells. Therefore, candidate P is determined to have a higher priority. The number of cells with large values is stored as a validity feature quantity. In other words, the validity feature quantity of the candidate P is 6 and the validity feature quantity of the candidate Q is 2 and these validity feature quantities are stored. A sequence of shadow gradation portion candidates is created by comparing these two terms for the combination of all shadow gradation portion candidates and comparing the number of priority determinations with the total of validity feature quantities.

More precisely, the sequence of shadow gradation portion candidates is created by multiplying the number of priority determinations with weighting of 100 and adding the resulting value to the total of validity feature quantities. In the description hereafter, a validity feature quantity incorporating an added weighting for the number of priority determinations is termed a "second validity feature quantity".

After step S705, in step S706, the combination (X) of shadow gradation portions is performed. In other words, a shadow gradation portion candidate is selected to perform luminance correction of the binding portion shadow and front edge shadow thereon. The selection is performed considering the fact that the total number of binding portion shadow ranges and front edge shadow ranges does not exceed 4 and that the respective luminance reduction directions are limited. As described above, this is due to the fact that since the above embodiment uses a method applied to the direction of shadow gradation, during analytical processing, the binding portion shadow is recognized as a separate range on the right and the left across the binding portion.

More precisely, the binding portion shadow range 403 in the example shown in FIG. 3A is handled separately as a binding portion in a left shadow range 405 and a binding portion in a right shadow range 406. Furthermore, the front edge range may be considered as a single range formed from the front edge in a left shadow range 402 and the front edge in a right shadow range 404.

That is, the shadow gradation portion candidates can be limited to a range containing the combinations shown below.

> Left front edge range (low left side luminance)+left range for binding portion (low right side luminance)+right range for binding portion (low left side luminance)+right front edge range (low right side luminance)

In other words, the left front edge range has low left side luminance. The left range for the binding portion has low right side luminance. The right range for binding portion has low left side luminance and the right front edge range has low right side luminance.

In the example shown in FIG. 3A, the respective ranges are the front edge in the left shadow range 402, the binding portion in the left shadow range 405, the binding portion in the right shadow range 406 and the front edge in the right shadow range 404.

Thus, the shadow luminance correction range is limited to all the above 4 ranges (the four shadow gradation ranges) or to a combination forming a subset thereof (one to three selected from the shadow gradation ranges).

The binding portion shadow is also composed of a pair formed from a left portion and a right portion. Therefore, a combination composed of a left low-luminance range and a left low-luminance range are eliminated. In the same manner, a list is created of all combinations of shadow gradation portion candidates satisfying these conditions.

Then, the priority determination method of comparing two terms performed in step S705 is carried out. A total feature quantity for the combination of gradation portion candidates is calculated by adding the second validity feature quantity for each shadow gradation portion candidate, to the gradation portion candidates contained in the combination of respective shadow gradation portion candidates.

A total feature quantity is calculated for the respective combinations in the list generated in the step S706. Then, the shadow gradation portion candidate combination having the maximum total feature quantity is adopted as a binding portion shadow gradation portion candidate in a main scanning direction.

In steps S707 to S714, the same processing is performed with respect to the sub scanning direction as performed for the main scanning process in steps S701 to S707, to search for binding portion shadow correction range candidates in the sub scanning direction. In this manner, a maximum of four shadow gradation portion candidates are selected in the main scanning direction and sub scanning direction. In the example shown in FIG. 10, a shadow gradation portion candidate X1 is selected in the main scanning direction. Shadow gradation portion candidates Y1, Y2, Y3, Y4 are selected in the sub scanning direction, which makes a total of five selected candidates in both directions.

In step S715, a two-term comparison is performed on the 8 shadow gradation portion candidates selected in each direction in the same sequence as the method described above in step S705 for all combinations of shadow gradation portion candidates. The order of the shadow gradation portion candidates and the direction of the binding portion is determined based on the number of priority determination that have been made in this manner.

When the correction range and the correction value for the highest priority shadow gradation portion candidate are less than a predetermined threshold, it is determined that there is no binding portion in the shadow. For example, when the maximum correction value is less than 1.5 times and the width of the correction range is less than 5 mm on the actual image, it is determined that a shadow does not contain a binding portion. The threshold value is determined empirically to be a value that does not cause erroneous recognition of a thin frame in the document image as a shadow even though there is not a binding portion to be corrected in the shadow.

Figure 13:
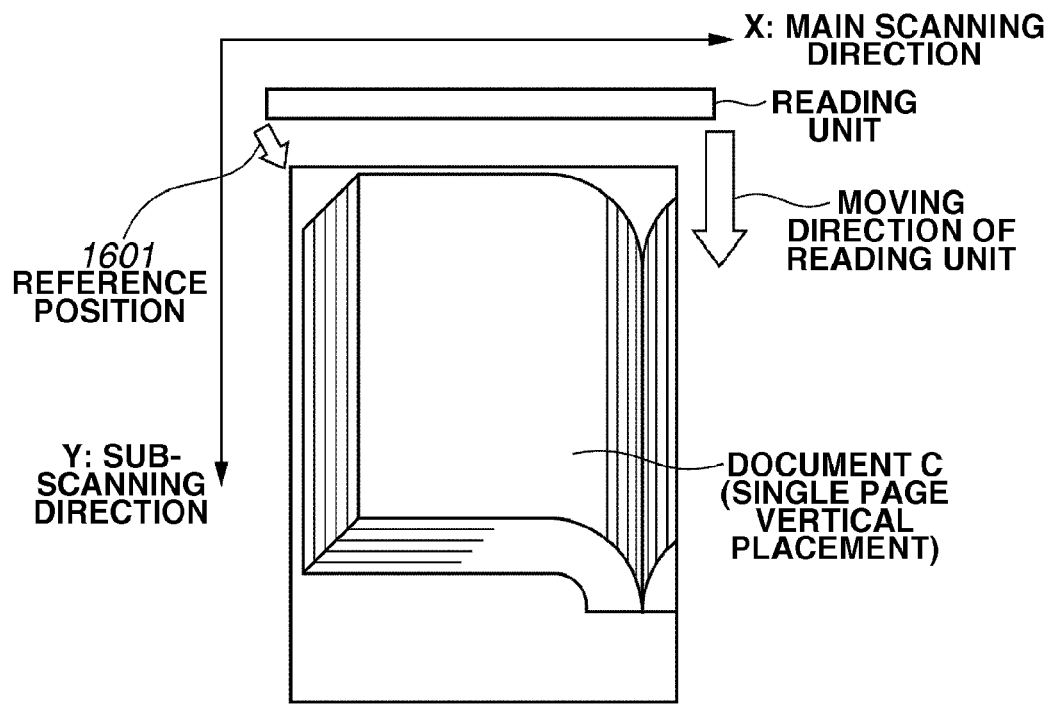
FIG. 13 illustrates the direction of document placement on a document platen enabling correction according to the first exemplary embodiment.

FIG. 13 illustrates the direction of placement of the document on the platen, which enables correction according to the first embodiment.

In this manner, as shown in FIG. 13, this method can be applied even when one of the front edges is not read. Furthermore, if the shadow gradation portion candidate showing the highest priority is the shadow gradation portion candidate in the main scanning direction selected in step S707, the binding portion is determined to be oriented in the sub scanning direction as shown in FIG. 3A. If the shadow gradation portion candidate having the highest priority is the shadow gradation portion candidate in the sub scanning direction selected in step S714, the binding portion is determined to be oriented in the main scanning direction as shown in FIG. 3B.

In the example shown in FIG. 10, the shadow gradation portion candidate Y3 is determined to have the highest priority and in step S715, the binding portion is determined to be oriented in the main scanning direction as shown in FIG. 3B. Thus, the process in step S716 is applied to the shadow gradation portion candidates Y1, Y2, Y3, Y4 which are candidates in the Y direction.

Figure 26:
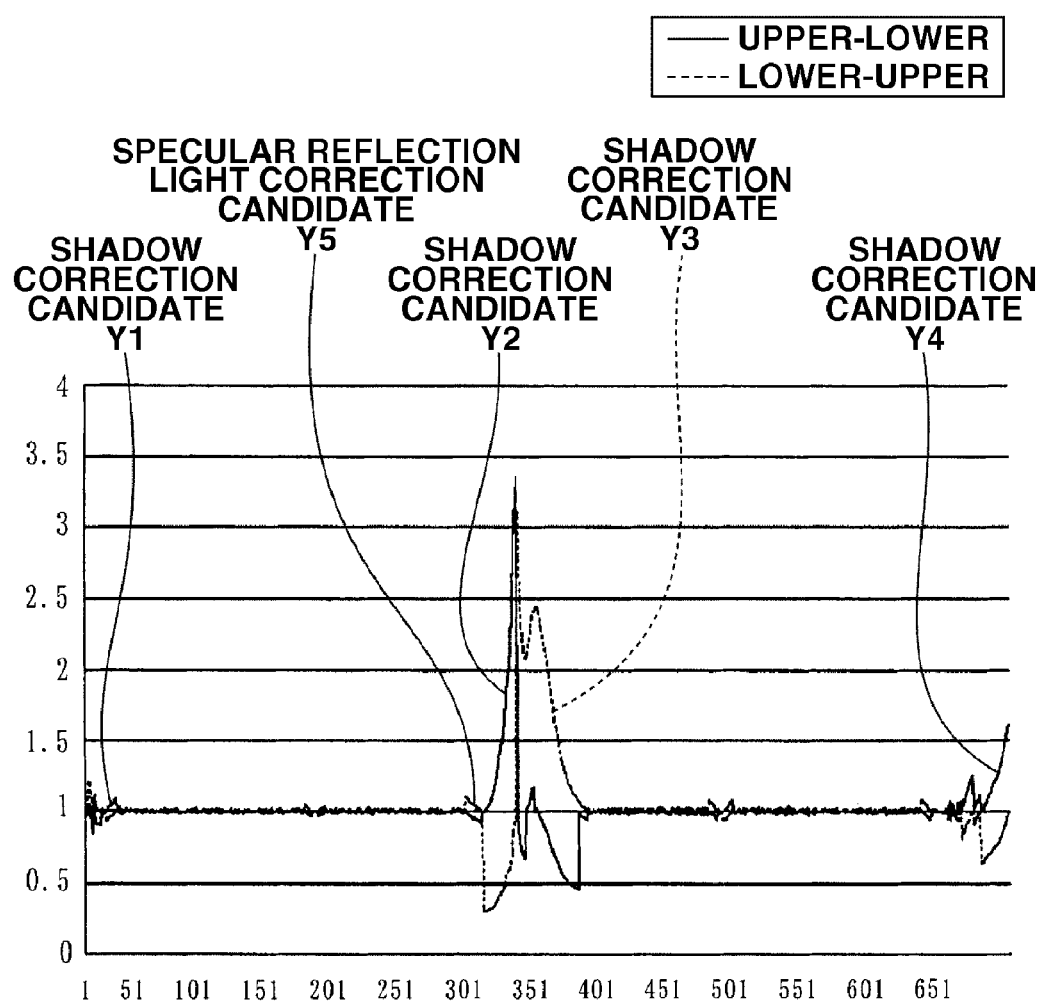
FIG. 26 is a graph illustrating an example of interlinear neighboring correction magnification with respect to the sub scanning direction when specular reflection is present.

FIG. 26 shows an example of interlinear cumulative correction magnification in a sub scanning direction when specular reflection is present.

The process in step S716 is applied to the shadow gradation portion candidates Y1, Y2, Y3, Y4 in the same manner when specular reflection is present.

When the binding portion is determined to be oriented in the sub scanning direction, in step S720, an adjustment process related to the respective application of the cumulative correction magnification is performed with respect to the shadow gradation portion candidates in a main scanning direction selected in step S707. More precisely, when a front edge candidate is available, if the floating from the end of the analyzed image is greater than or equal to a predetermined threshold, for example, greater than or equal to 20 mm on the actual image, it is determined that the front edge candidate is not a front edge but the document texture and thus is eliminated from the shadow correction. In step S721, with respect to each range for shadow gradation portion candidates forming the subject of a shadow luminance correction, a luminance correction table is generated.

When the binding portion is determined to be in the main scanning direction, in steps S716, S717, a shadow luminance correction coefficient table is generated in the same sequence as above. This process is shown in FIG. 10B in which the binding portion is determined to be oriented in the main scanning direction.

More precisely, the shadow correction candidate Y2 and the shadow correction candidate Y3 shown in FIG. 10B as a pair are binding portion ranges. The cumulative correction magnification for that range is used as a luminance correction coefficient for correcting the binding portion shadow and becomes the correction coefficient for the shadow gradation portion A shown in FIG. 11. Furthermore, the shadow correction candidates Y1 and Y4 correspond to the shadow of the respective front edges and are correction coefficients for the shadow gradation portions B and C as shown in FIG. 11.

In step S718, the specular reflection range adjacent to the binding portion shadow range determined in the steps S716 and S717 is detected. In step S719, a luminance correction table for the specular reflection range is calculated continuing from the shadow luminance correction coefficient table data generated in step S717.

Next, a detection process for the specular reflection range performed in step S718 will be described in detail.

Figure 7:
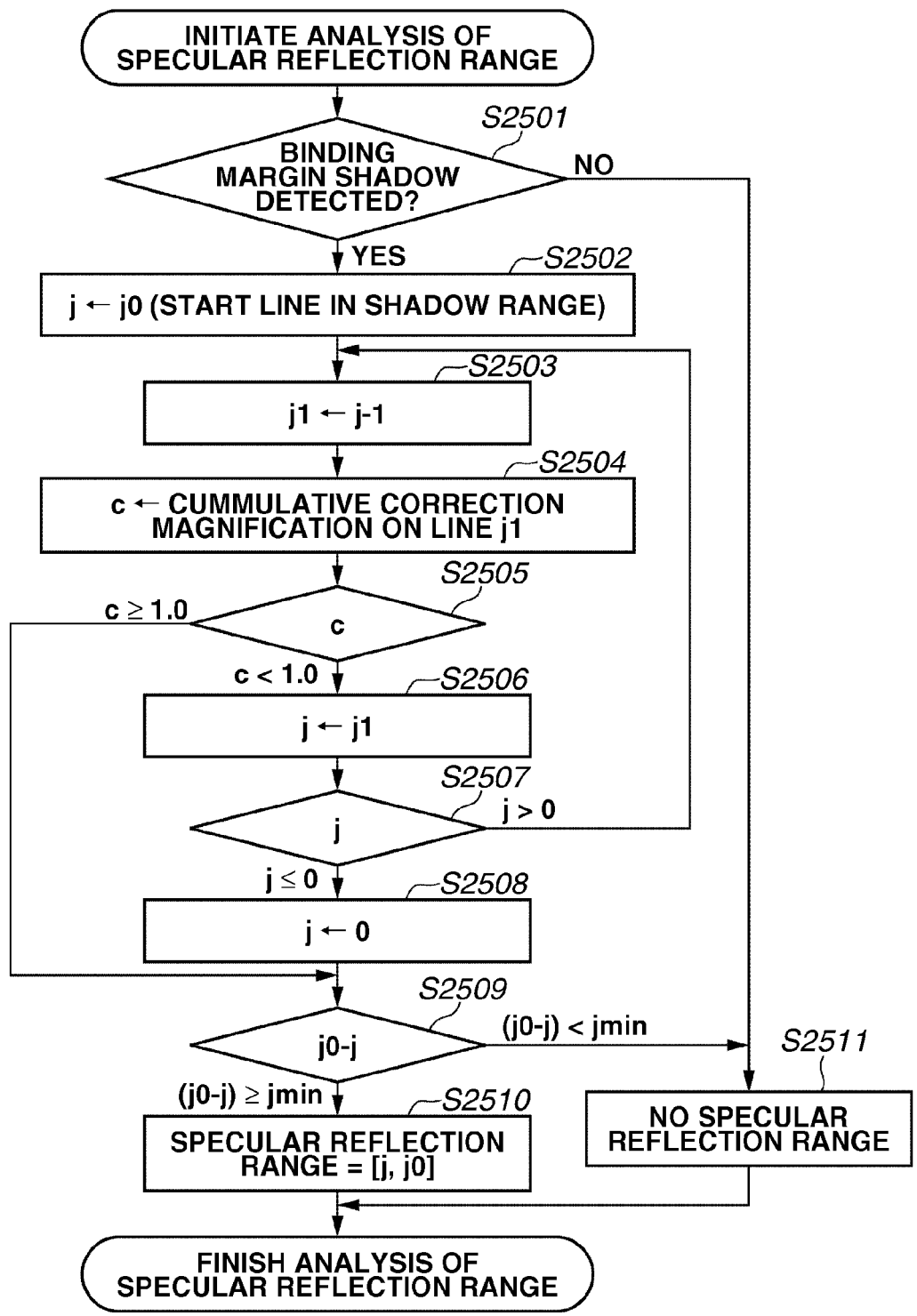
FIG. 7 is a flowchart illustrating a process of searching the specular reflection range during image analysis according to the first exemplary embodiment.

FIG. 7 is a flowchart illustrating a process of searching a specular reflection range during image analysis according to the first exemplary embodiment.

In step S2501, the presence or absence of a binding margin shadow is determined. The determination of the presence or absence of a pair of shadow ranges such as the shadow gradation portion candidates Y2 and Y3 as shown in FIG. 10B or FIG. 26 is performed in step S716 and the results are referred to.

When the binding margin shadow is not present, in step S2511, it is determined that there is no specular reflection range. When the binding margin shadow is present, a range in which line cumulative correction magnification is continuously less than 1.0, is searched from the start line position (upper end of the range) j0 in the range.

In steps S2502 and S2505, the line cumulative correction magnification c acquired on the line j1 (step S2503) one line next to the verified line j is compared with 1.0. If the line cumulative correction magnification c is less than 1.0, in step S2506, it is determined to be a specular reflection range and the line j1 is substituted for the verified line j. Then in step S2507, it is determined whether the upper end of the image has been reached. When image data is complete, in step S2509, the specular reflection width is confirmed.

In step S2507, if there is still an image line remaining, the process in the steps S2503 to S2507 is repeated until the line cumulative correction magnification c takes a value greater than or equal to 1.0 or the image is completed. When the line cumulative correction magnification c takes a value greater than or equal to 1.0, searching the specular reflection range is terminated and in step S2509, and the width of the specular reflection is confirmed. If the width of the specular reflection range calculated using the initial position j0 in the shadow range and the verified line j is greater than or equal to the minimum width jmin already determined for correction, in step S2501, it is determined that the range j to j0 is the specular reflection range for luminance correction. When the range j to j0 is less than jmin, in step S2511, it is determined that a specular reflection range is not present.

Figure 24A:
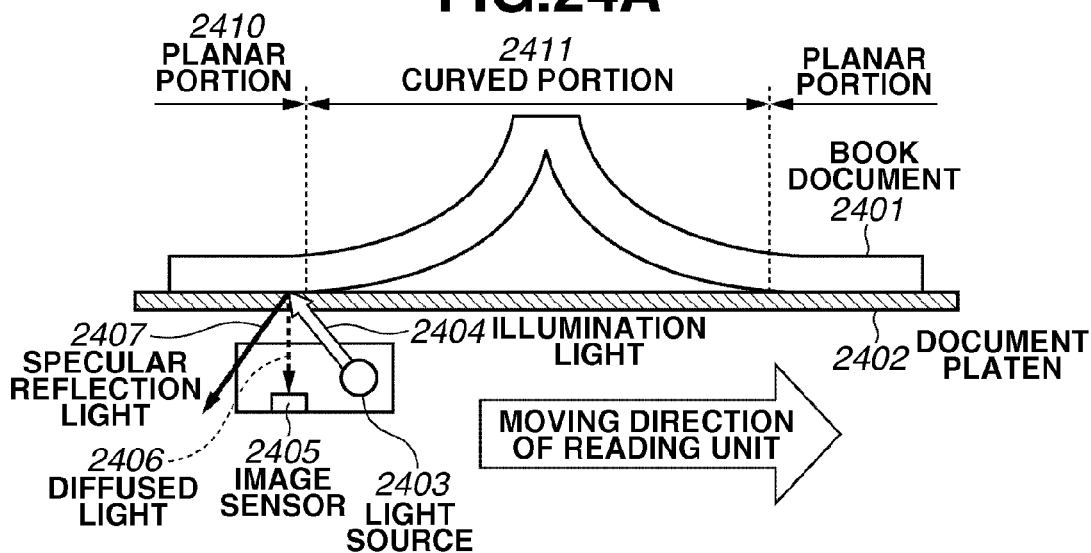
FIGS. 24A, B and C are sectional views seen in a direction from the top to the bottom of a book document opened and placed onto a document platen.
Figure 24B:
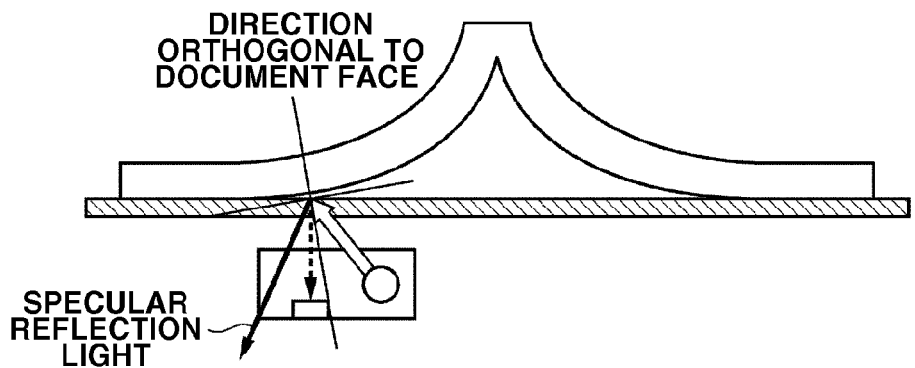
Figure 24C:
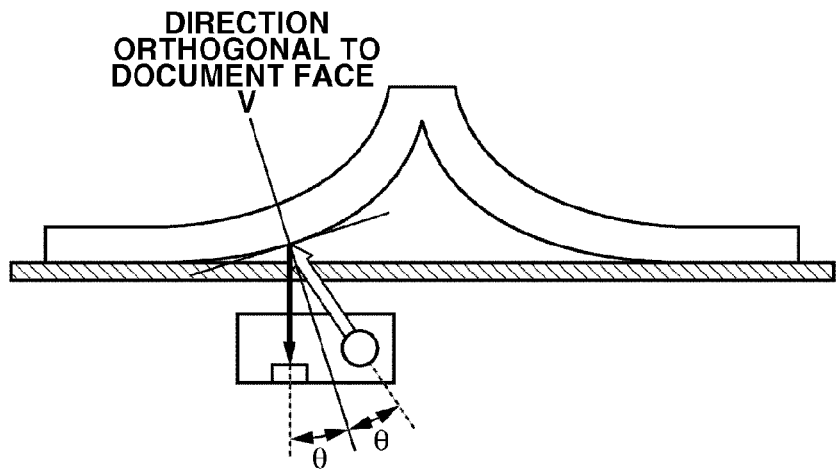

In the above description, a book document as shown in FIG. 24 is illuminated from the direction of movement of the reading unit towards the reading start position. Therefore, the upper side of a binding portion shadow is searched based on the fact that specular reflection occurs in the upper side of the binding portion. Conversely when the direction of illumination is oriented to the direction of movement, the specular reflection range is searched within the range adjacent to the lower side of the binding portion shadow. Furthermore, when illumination is performed by two illumination lamps from the upper and lower side of the image sensor, the specular reflection range is searched above and below the binding portion shadow. The illumination lamp is linear and in place of an illumination lamp, a linear illumination light guide may be provided.

In the flowchart shown in FIG. 7, when the interlinear cumulative correction magnification is initially 1.0 or more, in step S2505, it is determined that the specular reflection range has finished. However, a specular reflection range may be determined to continue until values exceeding 1.0 are repeated a number of times.

Figure 27:
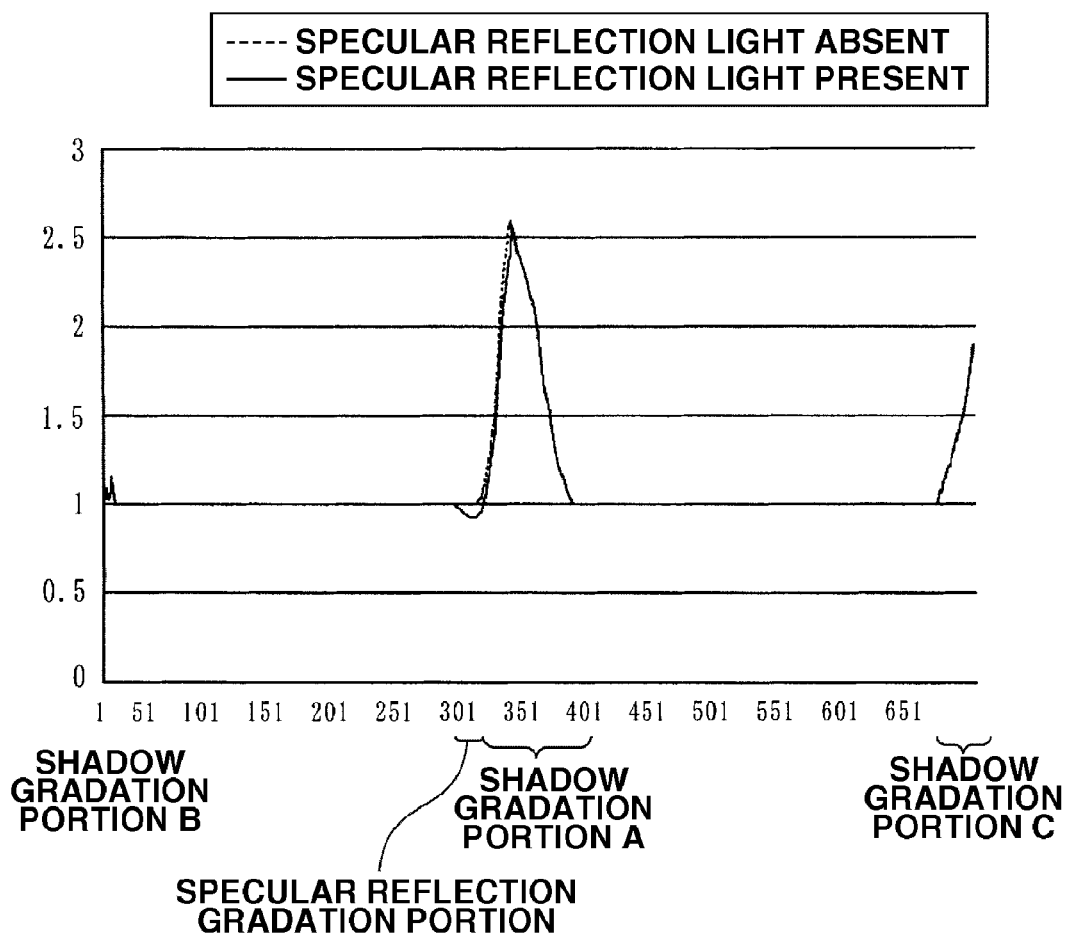
FIG. 27 is a graph illustrating an example of a shadow luminance correction coefficient when specular reflection is present.

FIG. 27 illustrates a luminance correction coefficient table for a specular reflection range.

The correction coefficient obtained by a method of correcting specular reflection together with the shadow luminance is shown by the solid line, and a correction coefficient when specular reflection correction is not performed is shown by the broken line.

By using a shadow luminance correction coefficient table generated as described above, in step S605, shadow luminance correction is performed in the shadow range of the pre-scan image. Alternatively in step S610, luminance correction can be performed in the binding portion or front edge shadow range in the main scan image. In this manner, darkening luminance for a binding portion or front edge shadow resulting from floating from the platen, and luminance from specular reflection on the document surface can be corrected.

A second exemplary embodiment of the present invention includes the image reading apparatus 100 and the external information device 150 as shown in FIG. 1. The operation of acquiring the luminance corrected image of the binding portion or front edge of the saddle-stitched book document is the same as the first embodiment.

In a case where the floating from the platen in the top and bottom of the binding portion of the document is different, the shadow width of the binding portion is different on both sides. When a saddle-stitched book document is placed in a slightly inclined orientation, the binding portion or front edge shadow inclines. In this embodiment, an analysis process in such a case will be described. A state in which the width of a binding portion shadow is different on both sides is hereinafter termed a "shadow extended state" and that type of shadow is called an "extended shadow".

Figure 14:
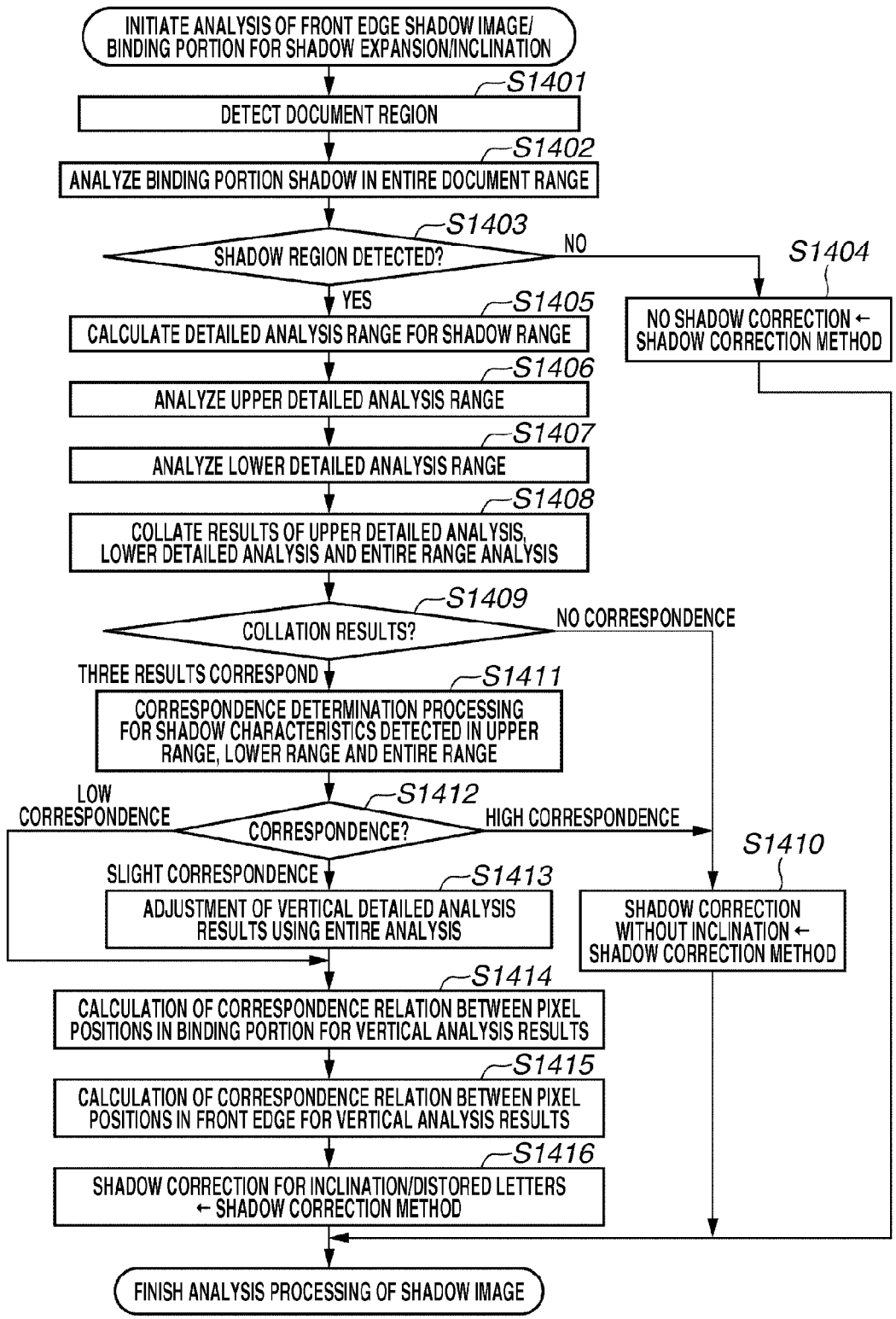
FIG. 14 is a flowchart showing analysis of an image shadow in which there is a difference in a floating height from the platen between the top and bottom of the document binding portion resulting from the manner in which the document on the platen is pressured.

FIG. 14 is a flowchart showing analysis of a shadow in which there is a difference in the floating height from the platen between the top and bottom of the document binding portion resulting from the manner in which the document on the platen is pressured according to the second exemplary embodiment.

In step S1401, the pre-scan image is analyzed and the document range on the platen is specified. In step S1402, the binding portion shadow and the front edge are detected within the document range detected in step S1401 and a shadow luminance correction coefficient is calculated. The detection of the shadow range in the entire document range and the calculation process for the shadow luminance coefficient table are the same as the process in the first embodiment.

In step 1403, it is determined whether a binding portion or front edge shadow is detected based on the results from step S1402. When a binding portion shadow or the front edge requiring luminance correction are detected, in step S1405, the analysis range is limited to a part of the range where a shadow was detected in the pre-scan image. The detailed shadow range is detected and the shadow luminance coefficient table is calculated to acquire the detailed characteristics of the binding portion or front edge shadow. Hereinafter, the process of the step S1402 is termed "entire analysis" and the entire analysis calculation result is termed "entire analysis result". When a binding portion shadow and the front edge are not detected, the shadow luminance correction process is not performed (step S1404).

Next, a process will be described which calculates the range for detailed analysis in step S1405 to acquire the detailed characteristics of the binding portion or front edge shadow.

Figure 15:
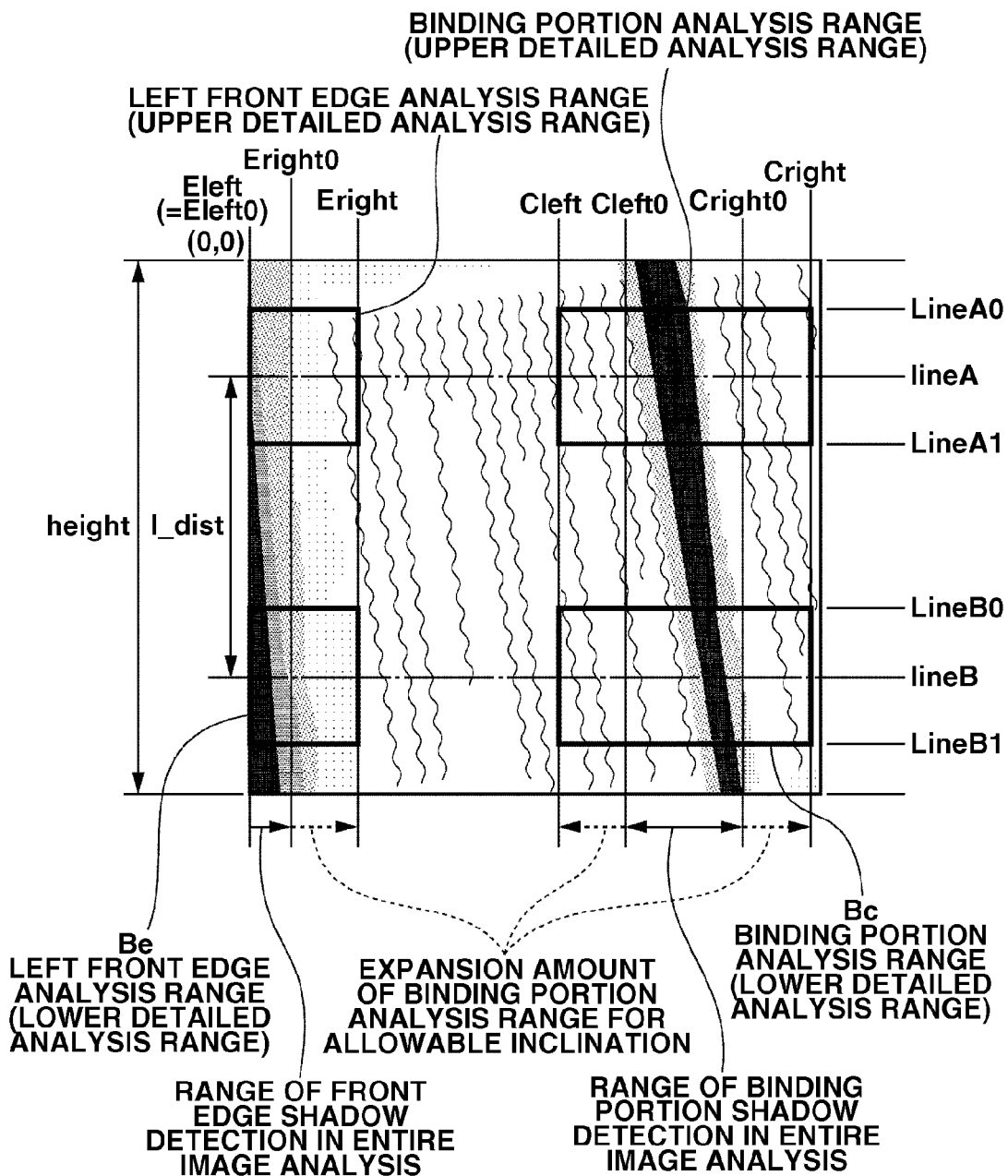
FIG. 15 describes the analysis range of a saddle-bound book document image inclining to the left with an angle of approximately slightly less than 10 degrees according to a second exemplary embodiment.

FIG. 15 describes the analysis range of a saddle-bound book document image inclining to the left with an angle of slightly less than 10 degrees according to a second exemplary embodiment. In FIG. 15, as an example, a document image having a binding portion shadow is shown in which the upper shadow width and darkness is broader and darker than the lower section. The binding portion shadow is on the right side of the image and a front edge shadow is placed on the left side.

The image range of the binding portion shadow calculated in the analysis of the entire document range in step S1402 is from Cleft0 to Cright0 and the left front edge is detected in a range from Elect0 to Eright0. In the analysis of the entire document range performed in step S1402, as described in the first exemplary embodiment, when the binding portion is vertical as shown in the figure, the shadow range and the correction table are calculated by averaging the luminance information in a vertical direction. Accordingly, the shadow extended state or inclined state are not taken into account. For this reason, the analysis range is limited to the top and bottom side along the binding portion or the front edge, detailed shadow analysis is performed and a change in the shadow state resulting from the shadow extended state or inclined state are detected.

The ranges LineA0 and LineA1 for the height of upper analysis range (Ac) of the binding portion and upper analysis range (Ae) of the front edge are calculated from the following formulas.

$$LineA0 = height \times 0.1 \quad (7)$$

$$LineA1 = height \times 0.4 \quad (8)$$

The range LineB0 and LineB1 for the height of upper analysis range (Bc) of the binding portion and upper analysis range (Be) of the front edge are calculated from the following formulas.

$$LineB0 = height \times 0.6 \quad (9)$$

$$LineB1 = height \times 0.9 \quad (10)$$

The upper left corner of the coordinate system in the example shown in FIG. 15 has reference coordinates of (0, 0). The direction of increase to the right shows pixel position coordinates. The direction which increases downwardly shows line position coordinates.

Line positions separated by 0.1 from the top and bottom of the respective analysis ranges are set as an upper analysis range and lower analysis range. The reason for this is to avoid an effect of external light on the density of the shadow near the light that enters as stray light from the top and bottom of the binding portion due to floating from the platen. The central coordinates line A and line B with respect to the height direction of the respective analysis ranges are obtained using the following formulas.

$$lineA = (LineA0 + LineA1)/2 = height \times 0.25 \quad (11)$$

$$lineB = (LineB0 + LineB1)/2 = height \times 0.75 \quad (12)$$

The central coordinates line A and line B with respect to the height of the respective analysis ranges are used as reference lines for the luminance correction table calculated from the upper and lower analysis range. Values suitable for he constants in Formulas 7 to 10 are preferably calculated by an empirical method for the image reading apparatus that reads images requiring shadow correction.

Next, the ranges Cleft and Cright for the width of the binding portion analysis range (Ac, Bc) and the ranges Eleft and Eright for the width of the front edge analysis ranges (Ae, Be) are calculated from the formulas below.

$$Cleft = Cleft0 - ExtRange \quad (13)$$

$$Cright = Cright0 + ExtRange \quad (14)$$

$$Eleft = Eleft0 - ExtRange \quad (15)$$

$$Eright = Eright0 + ExtRange \quad (16)$$

The ExtRange in the above formula is a value calculated from the following formula using the distance l_dist between the line A and the line B. The ExtRange expresses the extension amount analyzed by extending the analysis range from the entire analysis results and taking into account the allowable level for correction relative to the opening or angle θ of the extended shadow.

$$ExtRange = l\_dist \times \tan(\theta) \quad (17)$$

However, if the calculations from Equations (13) to (16) are negative, a value of zero is substituted. If the width of the image is exceeded, an image width (width) value of −1 is substituted.

As to the ranges (Ac, Ae, Bc, Be) for detailed analysis calculated in step S1405, the shadow in the same sequence is analyzed similarly as in the entire analysis. Since the upper analysis range of the binding portion (Ac) and the upper analysis range of the front edge (Ae) have common height ranges, in step S1406, block analysis is performed.

Since detailed analysis already detects the direction of the binding portion, the analysis is only performed in one direction. More precisely, in the flowchart shown in FIG. 5, detection of the horizontal shadow range and calculation of the luminance correction table are performed in accordance with steps S701 to S707, S718 and S719 which are processes for analyzing horizontal luminance variation. In step S1407, similar analysis is applied to the lower analysis range of the binding portion (Bc) and the lower analysis range of the front edge (Be).

Figure 16A:
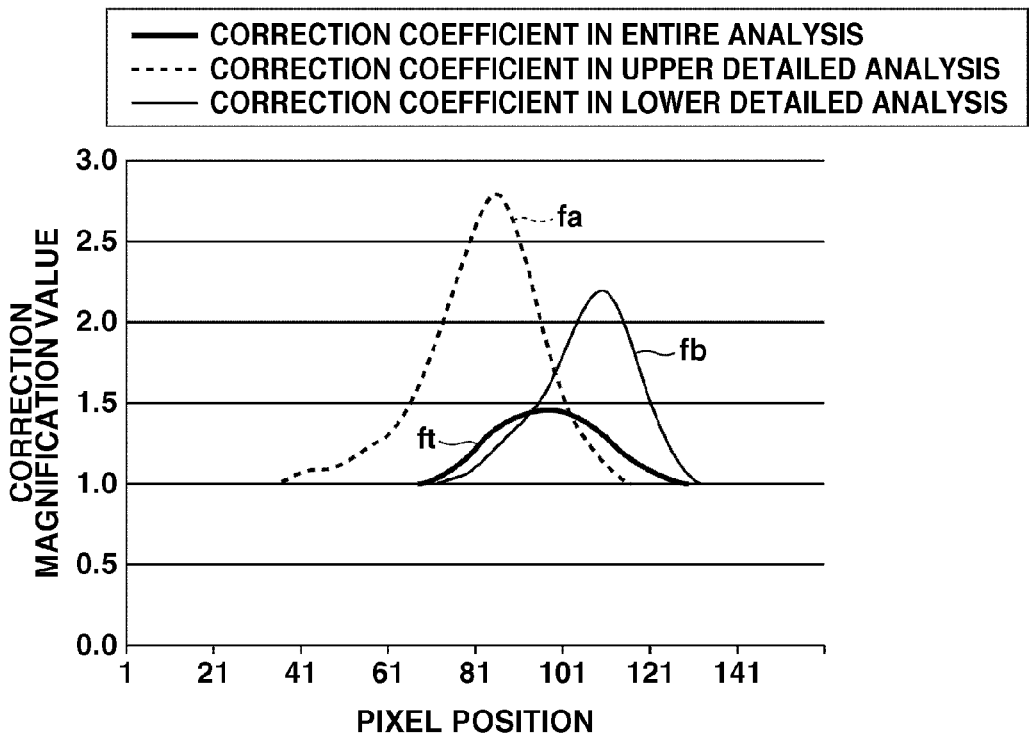
FIG. 16A illustrates a luminance correction magnification table calculated from the analysis range (Ac and Bc).

FIG. 16A illustrates a luminance correction magnification table calculated in the analysis range (Ac and Bc). In FIG. 16A, the broken line fa is the result in the binding portion upper side (Ac) and the solid line fb is the result in the binding portion lower side (Bc). The thick line ft expresses the entire analysis result.

In the detailed analysis in steps S1405, S1406 and S1407, a detection process for the specular reflection range in proximity to the binding portion shadow is performed according to the presence or absence of a binding portion shadow in the sequence described in detail in the first exemplary embodiment.

Figure 16B:
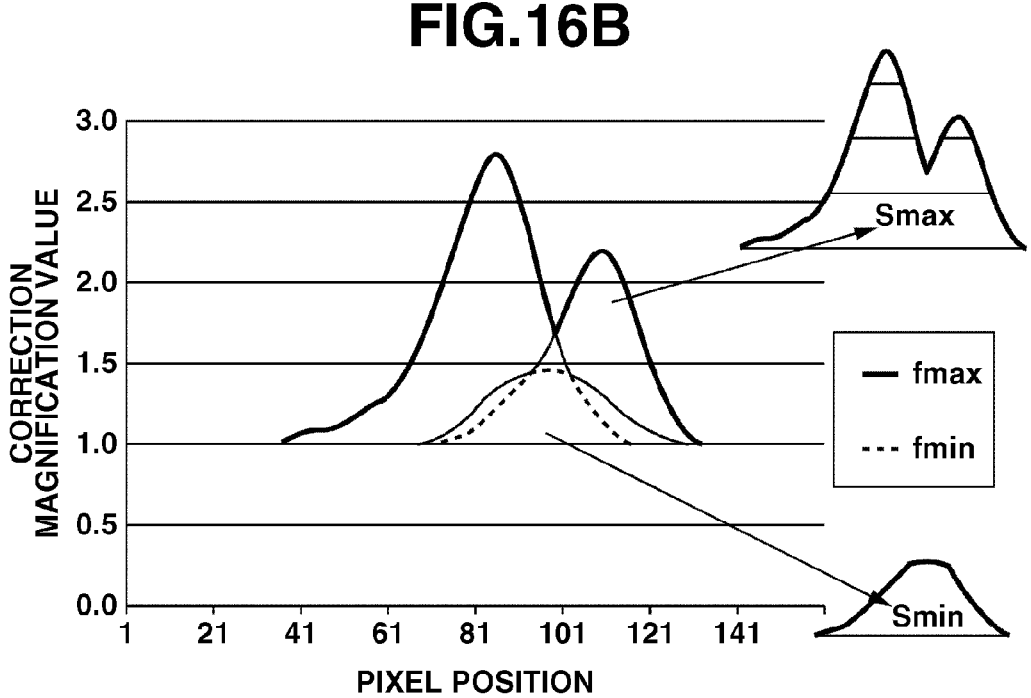
FIG. 16B illustrates fmax, Smax, fmin, Smin.
Figure 16C:
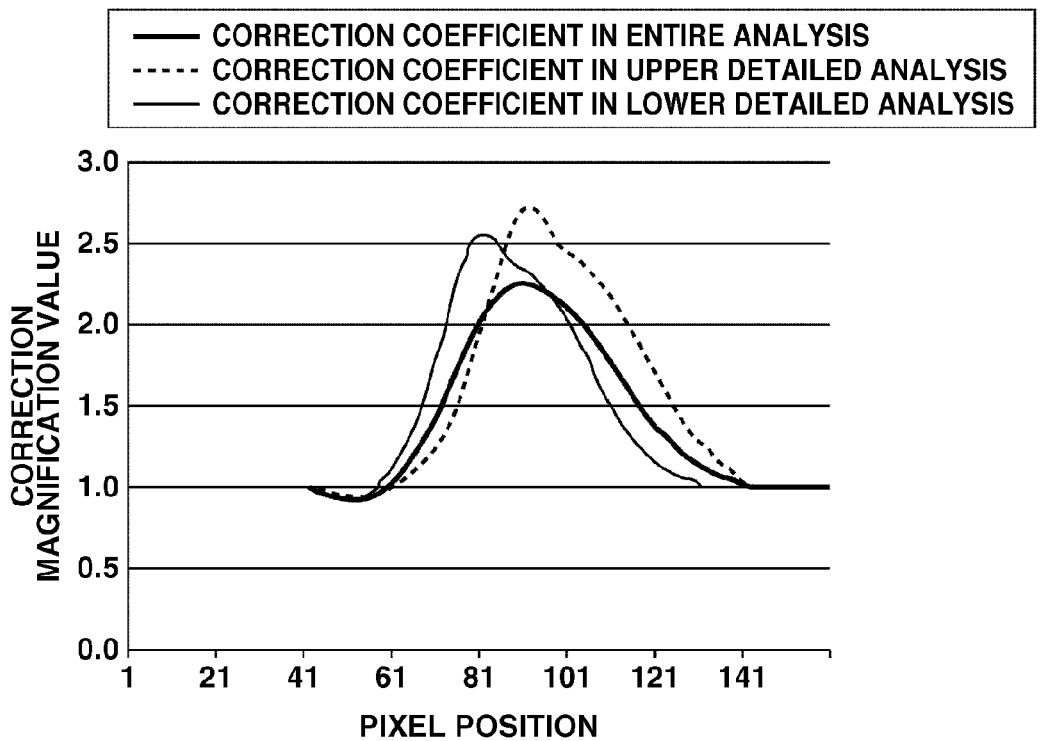
FIG. 16C illustrates a luminance correction magnification table calculated when specular reflection is present.
Figure 16D:
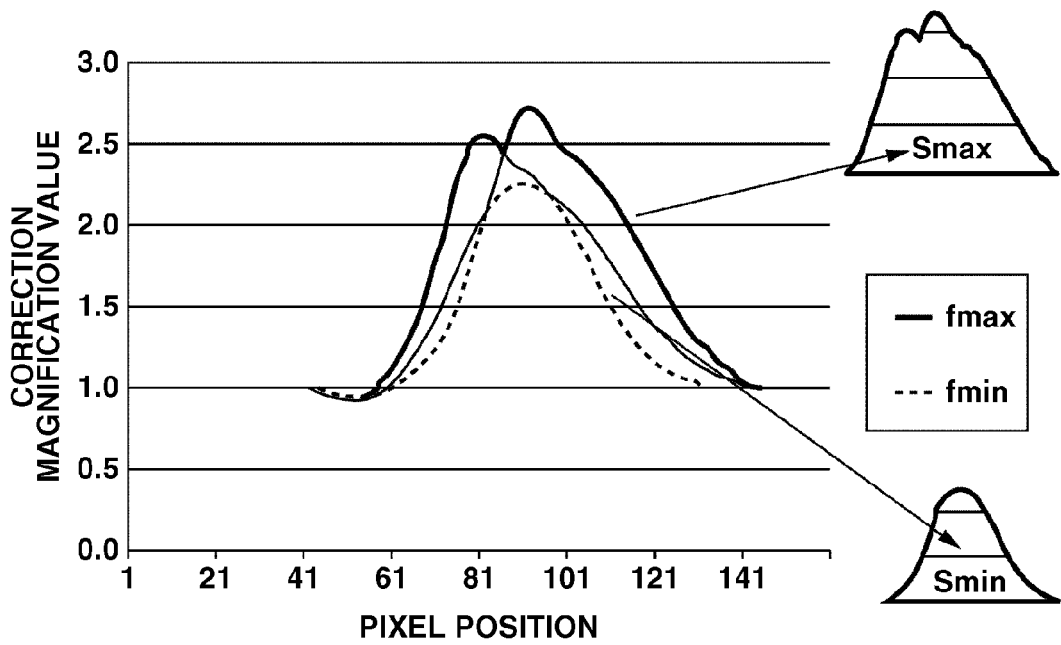
FIG. 16D describes the combination of a shadow luminance correction coefficient from partial analysis and a shadow luminance correction coefficient from entire image analysis.

FIG. 16C illustrates a luminance correction magnification table calculated when specular reflection is present. A book document is less inclined than the example shown in FIG. 16A. Specular correction ranges equal to or less than 1.0 magnification are detected in entire analysis, upper detailed analysis, and lower detailed analysis, respectively.

In step S1408, processing is performed to collate the entire analysis results with the upper and lower detailed analysis results. For example, when the shadow range inclines in close proximity to the image end, even when a binding portion shadow is detected as a whole, if the top and bottom of the binding portion are omitted from the image, those sections are not detected as a binding portion. In this case, the characteristic difference between the top and bottom of the shadow is not represented in the correction processing and an acceptable shadow corrected image is acquired in the entire analysis results by uniform upper and lower correction.

Collation Rule 1: Make a determination of "agreed" when both the upper and lower detailed results of the entire analysis results include a binding portion, and make a determination of "disagreed" when either the upper or lower detailed results did not find a binding portion section or do not include a binding portion.

Collation Rule 2: Make a determination of "agreed" when the entire analysis results include a front edge and both the upper and lower detailed results also include a front edge, and make a determination of "disagreed" when either the upper or lower detailed results does not include a front edge.

Collation Rule 3: Make a determination of "agreed" if the entire analysis results only include a front edge and both the upper and lower detailed results include a binding portion.

When the collation results are "disagreed", in step S1410, uniform shadow correction is performed on the entire analysis results without considering shadow extension or shadow inclination. In step S1411, when the shadow detection results in the entire analysis agree with the shadow detection results in the upper and lower detailed analysis, a determination is made as to whether the shadow characteristics agree. When the shadow in the entire analysis agrees with the shadow in the upper and lower detailed analysis, it is determined that an amount of inclination in the binding portion or front edge is small. In that case, uniform shadow correction is performed in the entire analysis results and a natural and corrected image is acquired without performing unnecessarily detailed correction.

Next, agreement determination of shadow characteristics in the results of the entire analysis and the upper and lower detailed analysis will be described based on the analysis results in FIG. 16.

As described above, a maximum value fmax and a minimum value fmin of the correction magnification value are calculated for each pixel position using the entire analysis result ft, the result fa for the upper binding portion side and the result fb for the lower binding portion shown in FIG. 16A. That is, $$fmax(i)=max\{fa(i), fb(i), ft(i)\} \quad (18)$$

$$fmin(i)=min\{fa(i), fb(i), ft(i)\} \quad (19)$$

The symbol i denotes a pixel position variable and max{ } and min{ } give respectively maximum and minimum values. The functions fmax and fmin calculate the integrated values Smax and Smin by integrating sections in which the value of the function exceeds 1.0.

$$Smax=\Sigma(fmax(i)-1.0) \quad (20)$$

$$Smin=\Sigma(fmin(i)-1.0) \quad (21)$$

FIG. 16B shows fmax, Smax, fmin, Smin.
Kt is calculated in Formula 22 using Smin and Smax.

$$Kt=Smax/Smin \quad (22)$$

For example, when the level of shadow extension or inclination is low, the lines fa and fb are similar to the line ft, and fmax and fmin take similar values. Consequently, the difference between the values for Smax and Smin grows smaller and the value for Kt approaches 1.0.

Conversely, when the level of inclination is large, since the similarity between fa and fb becomes smaller, the values for fmin(i) approach 1.0 and the value for Smin grows smaller. Consequently the feature quantity Kt expressing agreement between the entire shadow and an upper and lower section of the shadow range takes a larger value. Thus, the feature quantity Kt which expresses the agreement is a determination value for shadow extension or front edge inclination in the binding portion. When the level of shadow extension or inclination is low, the minimum value for the feature quantity Kt approaches 1.0 and when inclination is large, the feature quantity Kt takes a larger value.

When detecting specular reflection, while there are sections in which fa(i), fb(i), ft(i) take values of less than 1.0, Smax and Smin are only integrated in a range in which the respective values for fmax(i) and fmin(i) are 1.0 or more. In other words, Smax and Smin are calculated using the range shown in FIG. 16D.

In step S1412, the feature quantity Kt expressing agreement between the entire shadow and an upper and lower part of the shadow range is compared with preset threshold values KtOff and KtOn to determine whether the correction should take shadow extension/inclination into account. The values KtOff and KtOn are set so that the shadow luminance correction result becomes appropriate based on the analysis of a plurality of actual images including binding portions. More precisely, KtOff=1.2 and KtOn=2.0.

These threshold values are compared with the feature quantity Kt and the agreement of the features of the shadow both overall and in the upper and lower sections, in other words, the dimension of the inclination or the level of shadow extension can be determined. When Kt<KtOff, it is determined that the agreement between the entire shadow and an upper and lower section of the shadow range is high. In other words, there is low inclination/extension of the shadow and, in step S1410, uniform correction is performed using the entire analysis result (ft). When Kt>KtOn, since there is low agreement between upper and lower sections of the shadow, it is determined that there is large inclination/extension of the shadow and, in step S1414, shadow luminance correction is performed using the upper and lower detailed analysis result. Furthermore, when KtOff≦Kt≦KtOn, it is determined that there is some agreement between the upper and lower shadow. In such a case, a luminance correction table (fa2, fb2) is calculated in step S1413 combining the entire analysis result (ft) with the upper and lower detailed analysis result (fa and fb) and is used to correct shadow luminance.

Based on the above three separate cases (based on the difference between extension or inclination of the shadow) a natural correction result can be acquired.

The feature quantity KtRatio is calculated in Formula 23 below from the feature quantity Kt for use in calculating and combining the entire analysis result (ft) to the upper and lower detailed analysis result (fa and fb).

$$KtRatio=(Kt-KtOff)/(KtOn-KtOff) \quad (23)$$

Figure 17:
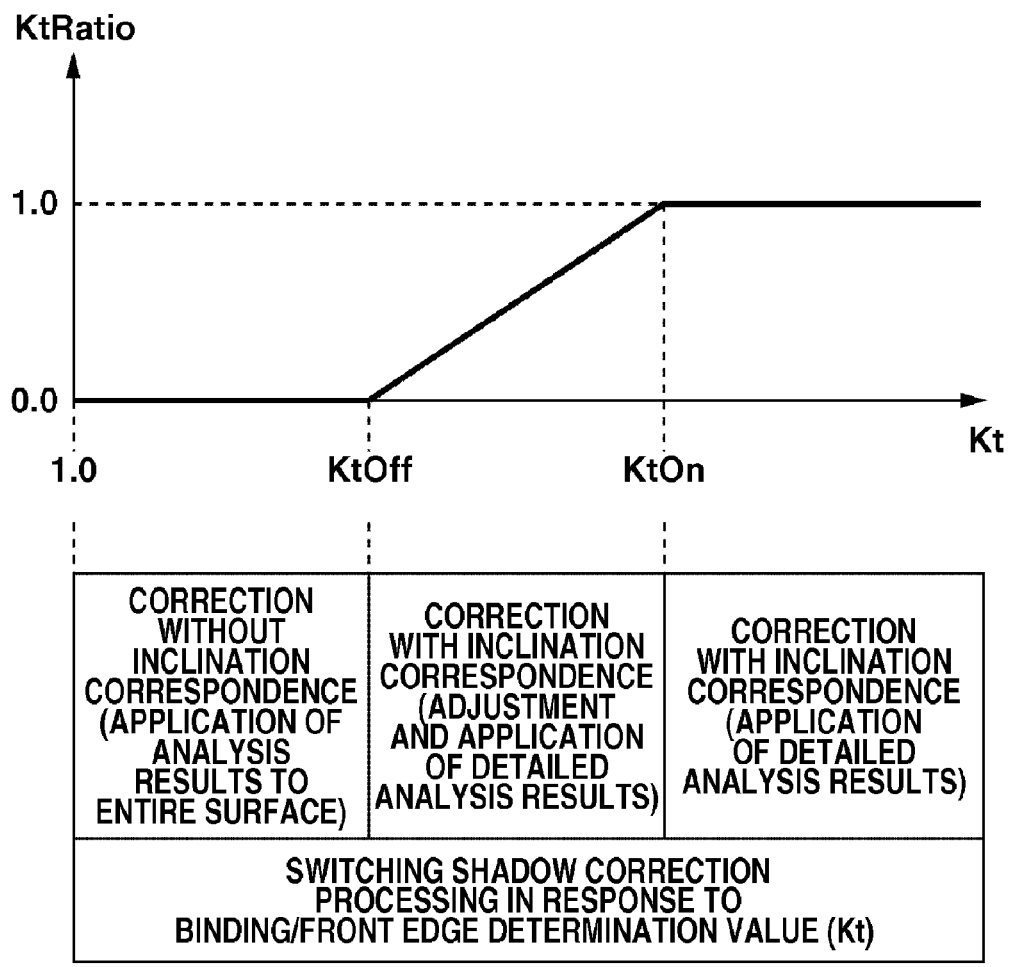
FIG. 17 illustrates the determination in step S1412 and the relationship between a feature quantity Kt and KtRatio.

The feature quantity KtRatio expresses the required level of shadow extension/inclination correction as a value from 0.0 to 1.0. A value of 0.0 corresponds to the uniform correction processing using the entire analysis result (ft) and 1.0 corresponds to correction processing using the upper and lower detailed results (fa and fb). FIG. 17 shows the relationship of the feature quantity Kt to KtRatio and the determination process of step S1412.

Next, the details of the process for combining the entire analysis result (ft) with the upper and lower detailed analysis result (fa and fb) using the luminance correction table shown in FIG. 16A will be described.

Figure 18A:
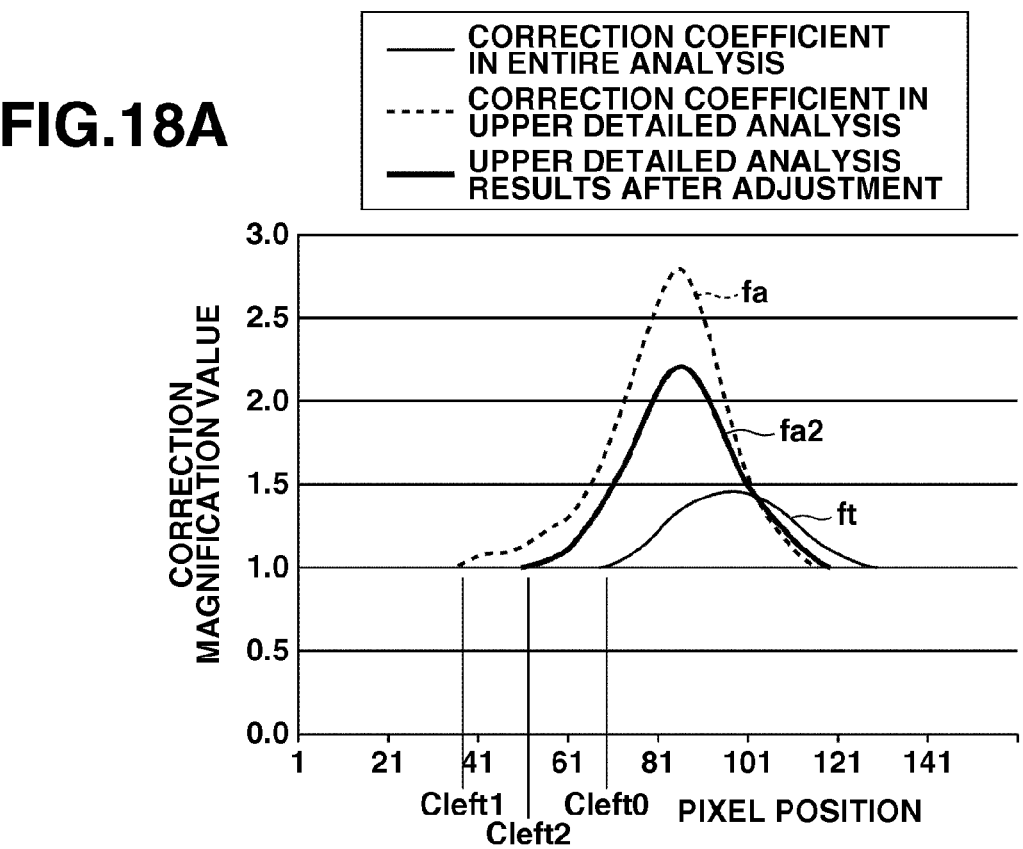
FIGS. 18A and B are graphs illustrating an example of the effect of the synthesis of a shadow luminance correction coefficient from partial analysis and a shadow luminance correction coefficient from analysis of the entire image.

FIG. 18A illustrates the entire analysis results (ft), the upper detailed analysis results (fa) and the upper composite correction table (fa2) combining the results (ft) and (fa). FIG. 18 illustrates an example of a combining effect when KtRatio takes a value of approximately 0.4.

The left end position (Cleft2) in the range of luminance correction performed with the composite correction table is calculated in Formula (24) below using the left end position (Cleft0) for the entire analysis result and the left end position (Cleft1) for the upper detailed analysis results.

$$Cleft2=Cleft0+(Cleft1-Cleft0)\times KtRatio \quad (24)$$

When the larger value of Cleft0 and Cleft1 is denoted as CleftIn, the value for fa2($i$) in the range Cleft2$\leq i \leq$CleftIn is calculated from Formula (25) below.

$$fa2(i)=(ft(i)\times(1-KtRatio)+fa(i)\times KtRatio)\times(Cleft2-i)/(Cleft2-CleftIn) \quad (25)$$

The value for fa2($i$) in the range CleftIn$\leq i$ is calculated from Formula (26) below.

$$fa2(i)=ft(i)\times(1-KtRatio)+fa(i)\times KtRatio \quad (26)$$

A right edge position (Cright2) of the range subjected to luminance correction and the right side of the composite table are calculated in the same manner using a composite correction table (not shown).

Figure 18B:
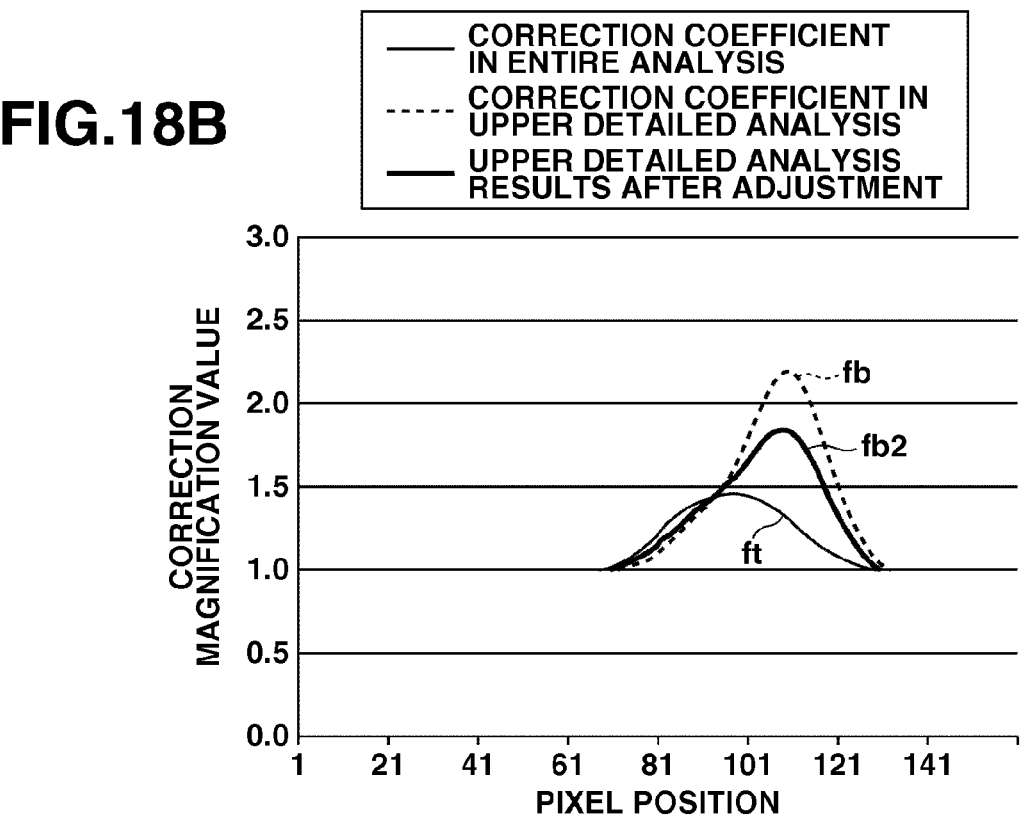

FIG. 18B illustrates the entire analysis result (ft), the lower detailed analysis result (fb) and the lower composite correction table (fb2) combining the results (ft) and (fb).

When an inclined front edge is detected, composite processing using a luminance correction table for the front edge section is performed using KtRatio calculated from the binding portion. When a binding portion is not detected in the image and only a front edge is detected, the above method uses the analysis results for the front edge section to calculate a feature quantity Kt and KtRatio and a composite process is applied using the luminance correction table for the front edge section.

The correction tables (fa, fb) for upper and lower detailed analysis or the upper and lower composite correction tables (fa2, fb2) are correlated to correct luminance of extended shadows or shadow in inclined binding portions. The connection uses correction table feature functions (ga, gb) calculated based on variable features of the upper and lower correction tables.

Figure 19A:
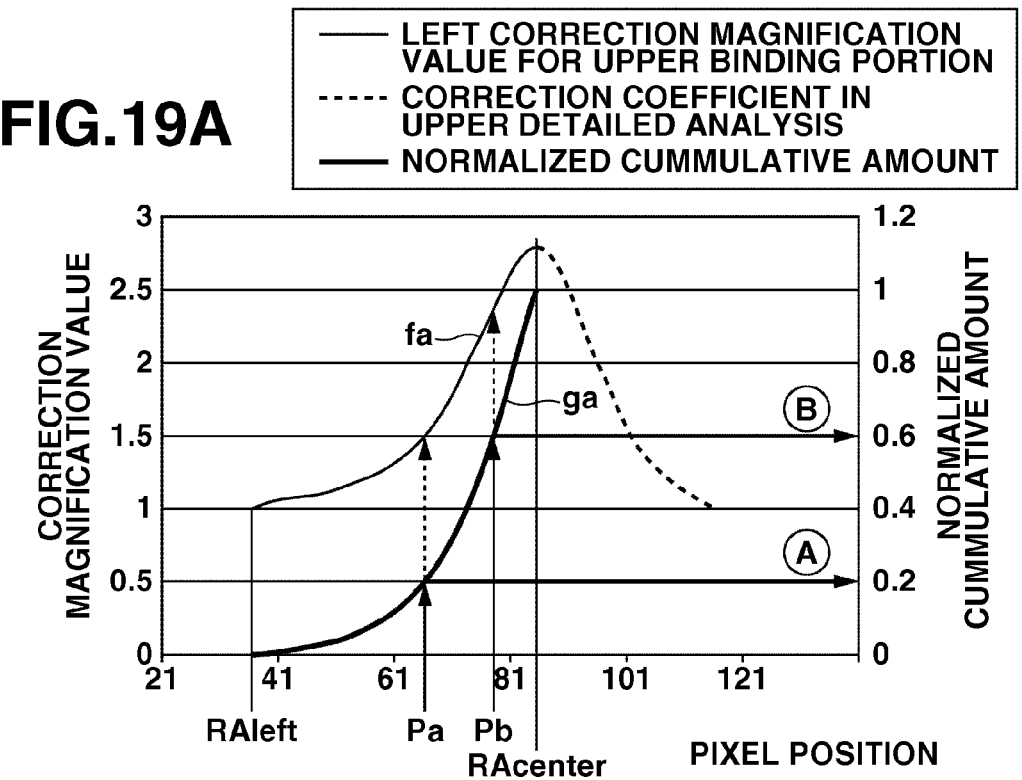
FIGS. 19A and B are graphs illustrating the correlation of the upper and lower shadow luminance correction coefficients in the binding portion.
Figure 19B:
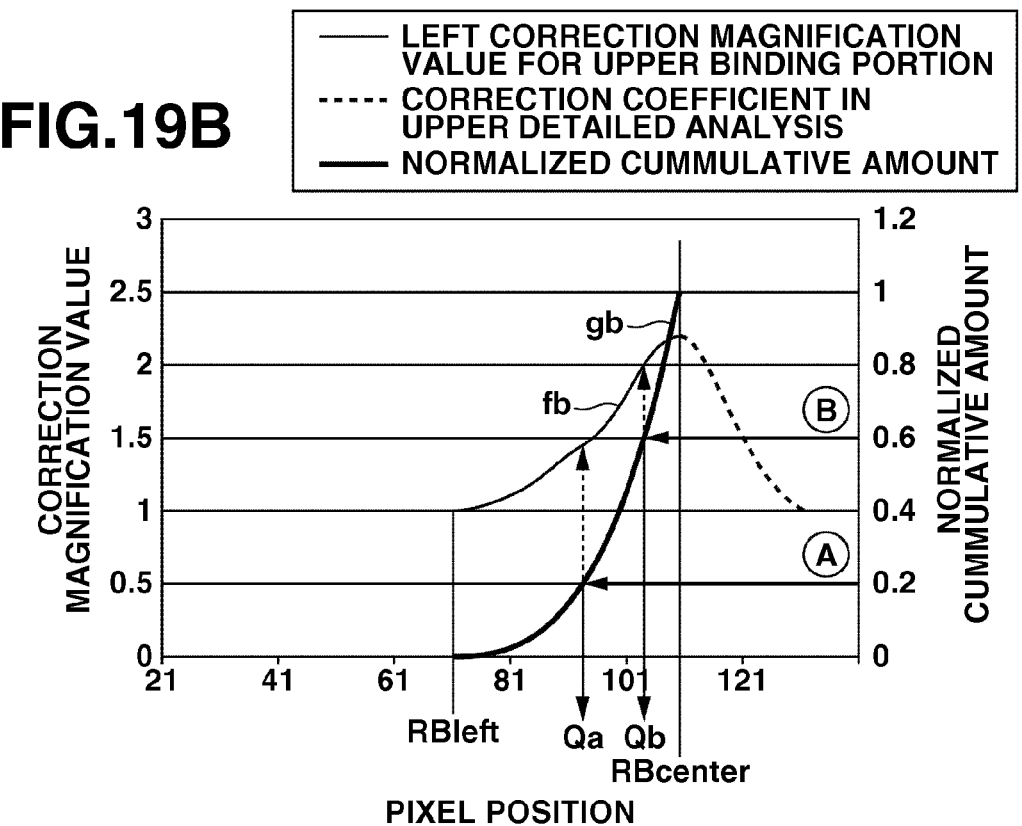

These relationships will be described in detail with reference to the upper binding portion correction table fa and the related correction table feature function ga shown in FIG. 19A, and the lower binding portion correction table fb and the related correction table feature function gb shown in FIG. 19B. Although the left side of the binding portion will be described as an example, the same description may be applied to the right side of the binding portion.

A position i=RAcenter at which the upper correction table fa(i) takes a maximum value is searched and is designated as the center position of the upper binding portion. From the left end i=RAleft of the upper correction table fa(i), the expression (fa(i)−1.0) is calculated for values up to i=RAcenter to obtain a correction table feature function ga(i). The feature function ga(i) is a result normalized for integrated values up to each position i (i.e., the RAcenter integrated values).

The correction table feature function ga(i) is a function taking a value of 0.0 at the binding portion end and a value of 1.0 at the binding portion center and is a monotone increasing function from the end towards the center. In the same manner, a lower correction table feature function gb(i) is calculated between the position i=RBcenter at which the lower correction table fb(i) takes a maximum value and the left end i=RBleft for the lower correction table fb(i).

The correction tables fa(i) and fb(i) are correlated via the respective correction table feature functions ga(i) and gb(i). The image position Pa in the upper binding portion shadow correlates with the image position Qa for the lower binding portion shadow. The image position Qa gives gb(Qa) which takes the same value as ga(Pa). The position Pa which is the luminance correction value fa(Pa) on the upper side and the position Qa which is the luminance correction value fb(Qa) on the lower side are deemed to be correlated to each other on the upper and lower binding portion and image luminance correction processing is performed as described hereinafter.

In step S1415, a correlation is applied to the correction tables obtained from the upper and lower detailed analysis results for the front edge section. Since the binding portion has a large effect on the width or luminance of a shadow resulting from the method of pressing on the platen cover or the method of placement on the platen, a correlation using the correction table feature function is required. However, only a part of the front edge of a book document may be visible in an image, or a simple correction may be sufficient for correcting front edge shadow luminance, the correlation related to a front edge section shadow is performed with reference to the pixel distance from a front edge start position.

FIG. 20 shows the analysis results of the left front edge section.

Figure 20A:
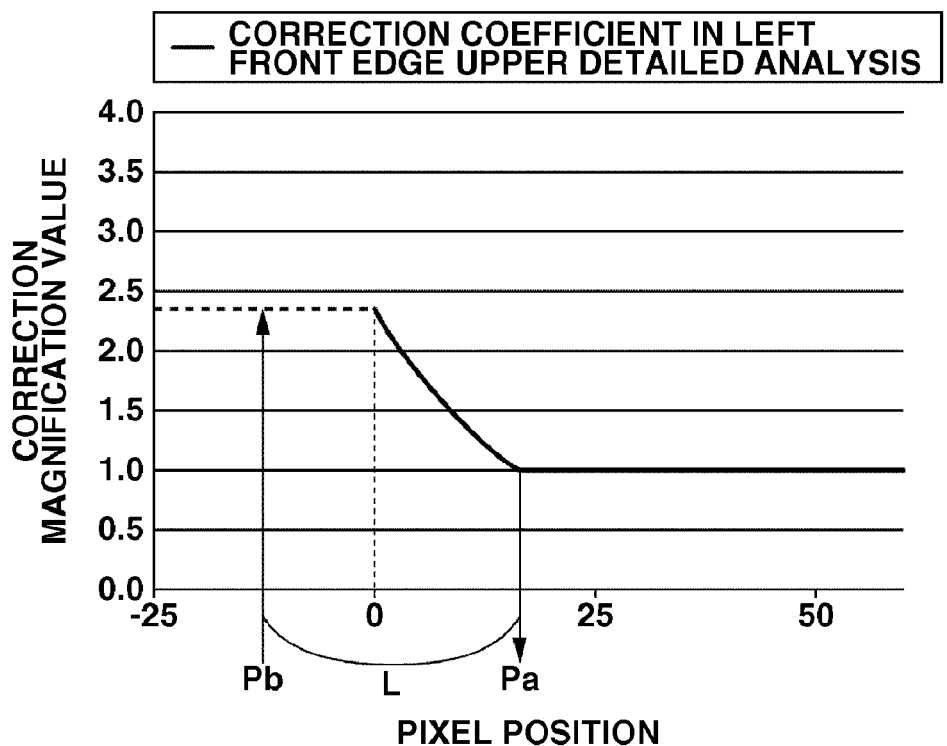
FIGS. 20A and B illustrate the analysis results for the left front edge portion.
Figure 20B:
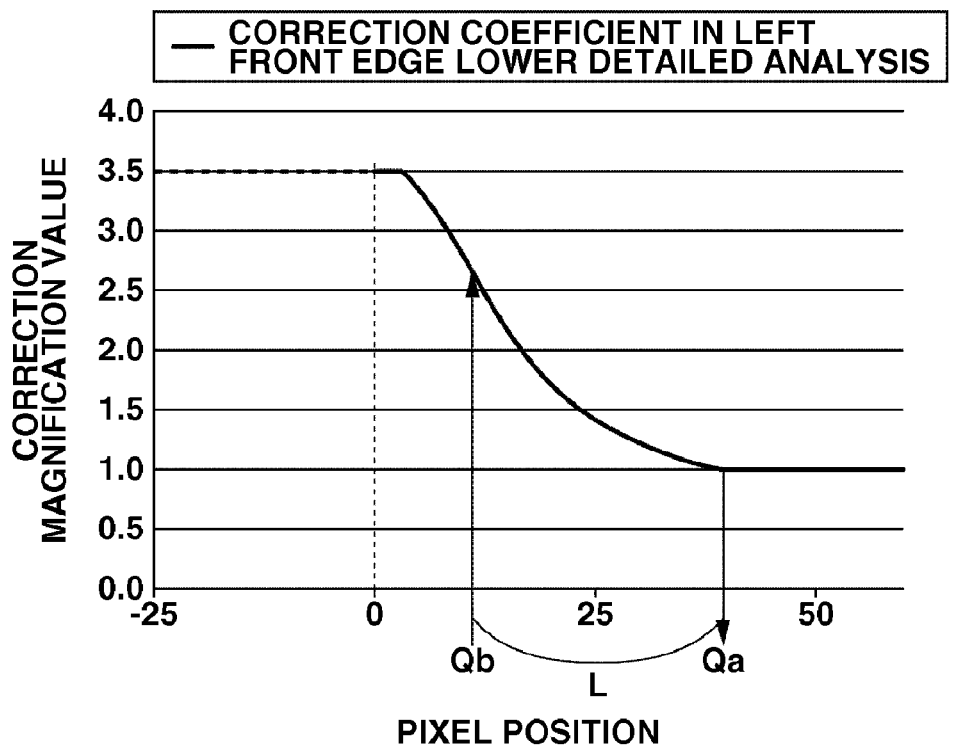

FIG. 20A is a correction table calculated on the upper side (Ae shown in FIG. 15) and FIG. 20B is a correction table calculated on the lower side (Be shown in FIG. 15). Firstly, the start positions for the shadow range in the front edge are correlated. Pa shown in FIG. 20A is a start position in the upper analysis range for the front edge and is correlated with the start position Qa in the lower analysis range for the front edge shown in FIG. 20B. For other front edge pixels, the pixel Pb having a length L from a start position Pa is correlated with a pixel Qb having a length L from a start position Qa.

In the example shown in FIG. 20, the upper front edge image width is narrower than the lower width and a correction value is required at negative pixel positions. Therefore, a correction value for a position 0 is extrapolated.

In FIG. 15 and FIG. 20, only the left document front edge is detected. However, the same correlation is applied when a front edge is included on the right side of a book document in an image. In steps S1414 and S1415, a correlation is determined for the binding portion and front edge correction tables calculated for the upper document image and the binding portion and front edge correction tables calculated for the lower document image. In step S1416, the analysis processing is terminated when there is a shadow extension or inclination.

Figure 21:
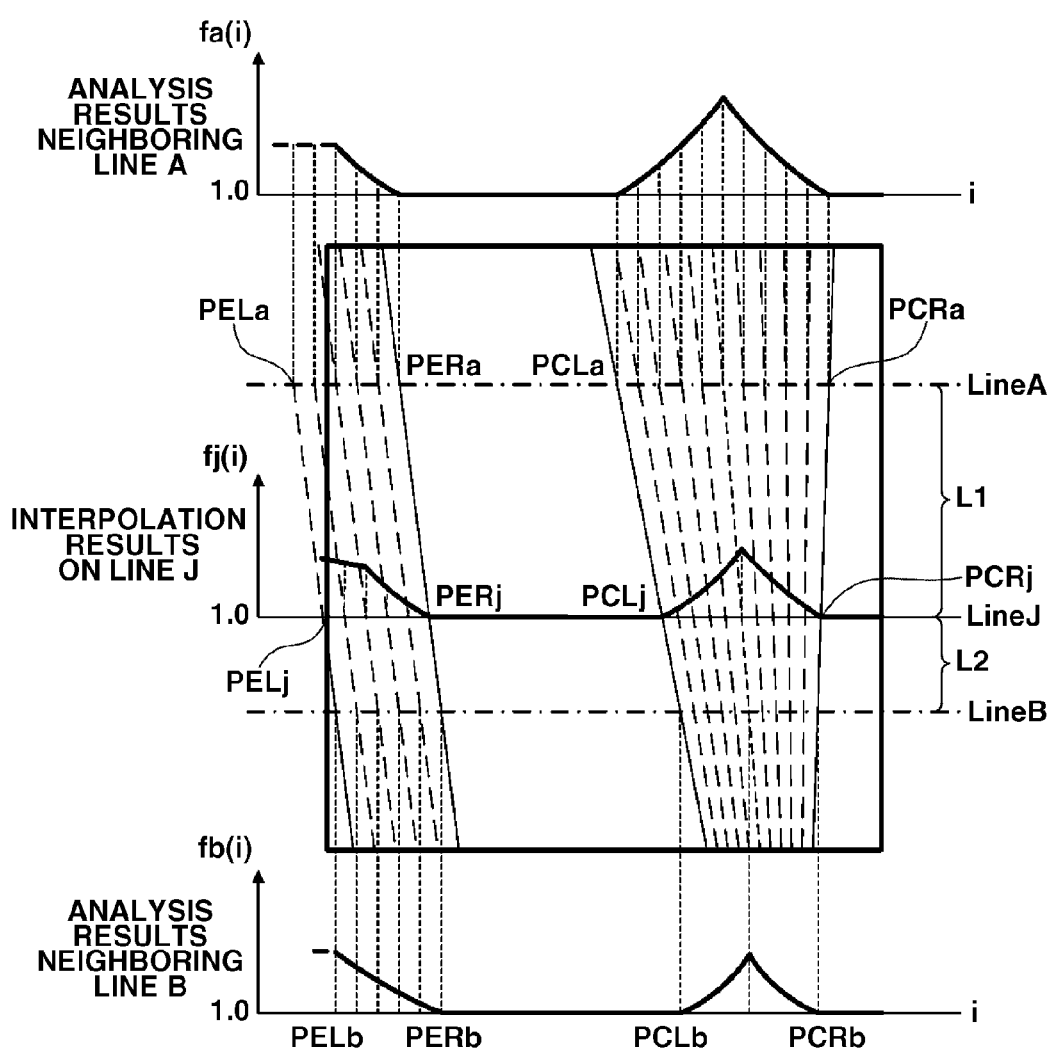
FIG. 21 illustrates the relationship between a luminance correction coefficient table fj(i) on the line position Line J and detailed analysis results fa(i) and fb(i) calculated respectively in proximity to Line A and Line B, when the shadow is extended or the binding portion is inclined.

FIG. 21 illustrates the relationship between the luminance correction coefficient table fj(i) on the line position Line J and the detailed analysis results fa(i) and fb(i) calculated respectively in proximity to Line A and Line B, when the shadow is extended or the binding portion is inclined.

The distance from the line position Line A to the Line J is denoted as L1 and the distance from the line position Line J to the Line B is denoted as L2. The distances L1 and L2 have signs ascribed thereto. For example, when the line position Line J is above the Line A, the distance L1 takes a negative value. The correction process for a shadow using fa(i) and fb(i) firstly calculates a shadow end pixel position as a position based on an interior division of L1:L2. The shadow end pixel position is calculated as a correction range for a shadow on a line position Line J, using a line position Line A and Line B. For example, the position PERj for the front edge right pixel on the line position Line J is calculated using Formula 27.

$$PERj=(PERa \times L2+PERb \times L1)/(L1+L2) \quad (27)$$

The position PCLj for the binding portion left pixel on the line position LineJ is calculated using Formula 28.

$$PCLj=(PCLa \times L2+PCLb \times L1)/(L1+L2) \quad (28)$$

PERa and PCLa are a right pixel position of the front edge and a left pixel position of the binding portion analyzed in proximity to Line A. PERb and PCLb are a right pixel position of the front edge and a left pixel position of the binding portion analyzed in proximity to Line B. A left pixel position of the front edge PELj and a right end pixel position of the binding portion PCRj on the line J are calculated in the same manner. An front edge left end pixel position of the front edge PELa on Line A is placed in a following position outside the image range.

$$PELa=PERa-(PERb-PELb) \quad (29)$$

Figure 22:
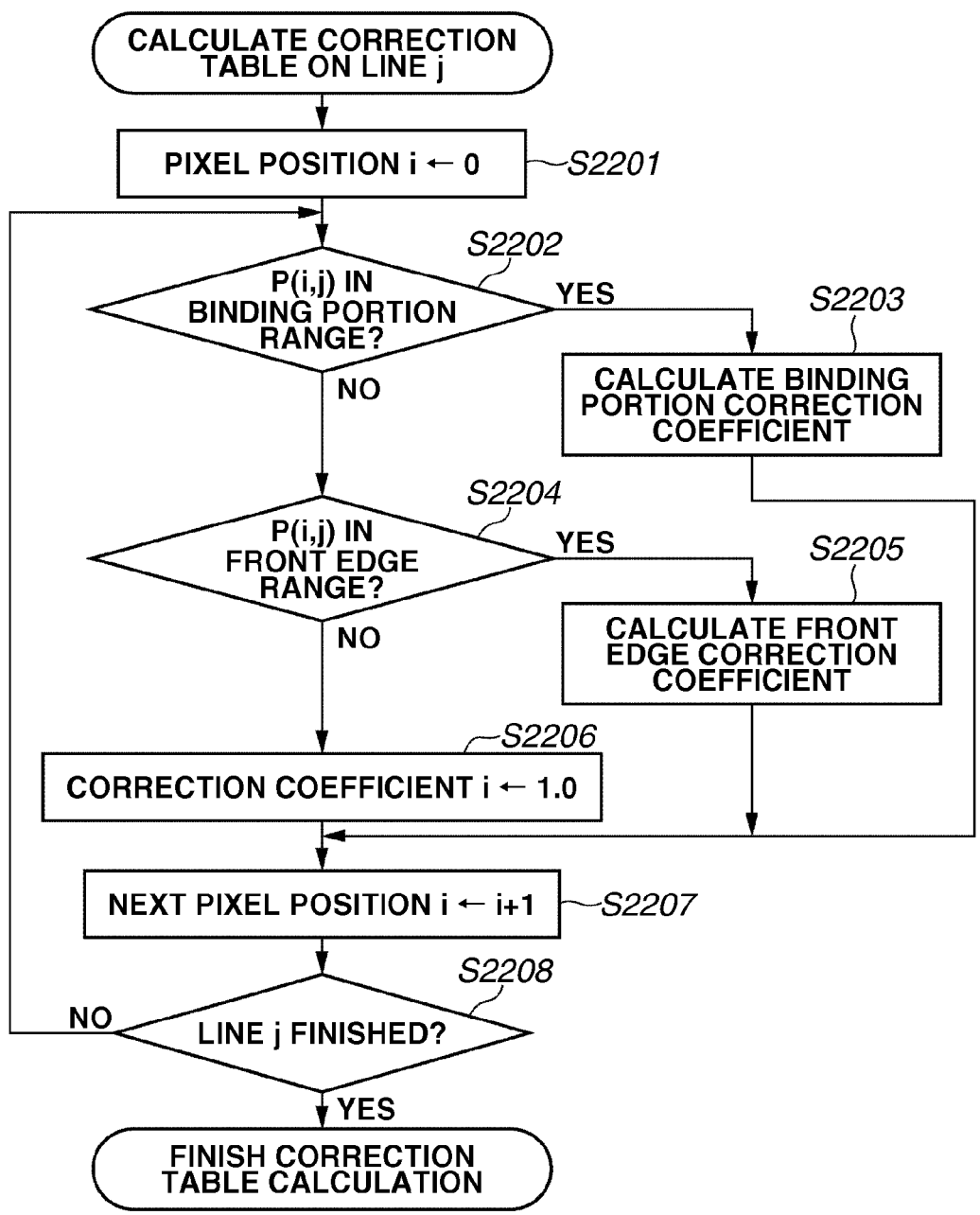
FIG. 22 is a flowchart illustrating a luminance correction coefficient table calculation process on Line J.

FIG. 22 is a flowchart illustrating a calculation process of luminance correction coefficient table on Line J.

In FIG. 22, pixels at a pixel position i on Line J are expressed as P(i, j). In step S2201, calculation is commenced from the left end of the image as the pixel position i for calculation. In step S2202, it is determined whether P(i,j) is in the binding portion range. More precisely, a pixel is in the binding portion range when $PCLj \leq i \leq PCRj$ and correction coefficient calculation for the binding portion range is performed in a step S2203.

Figure 23A:
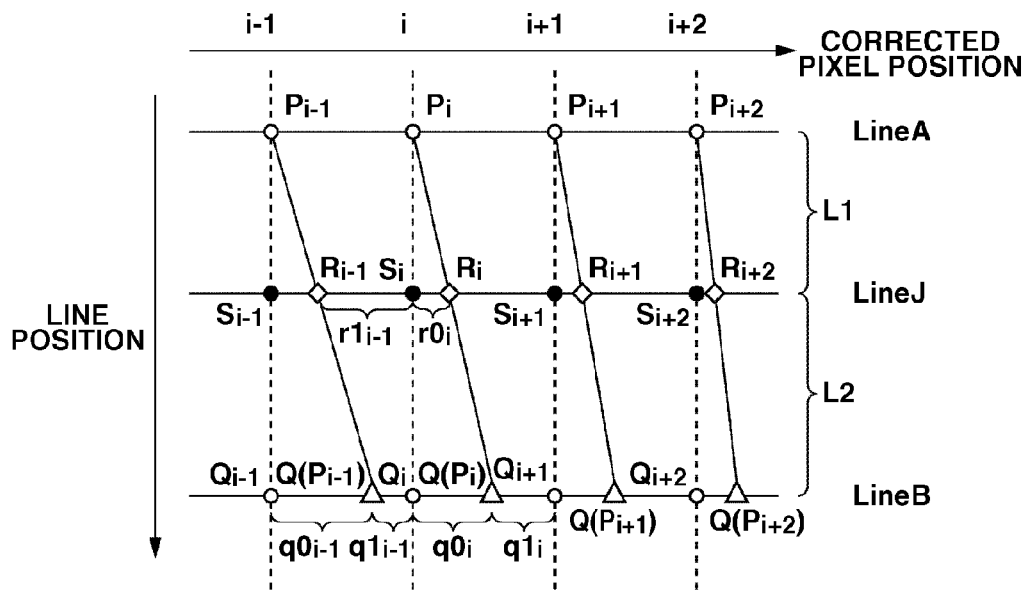
FIGS. 23A and B describe the luminance correction coefficient table calculation process on line J.

The correction coefficient calculation for the binding portion range will be described in detail making reference to FIG. 19 and FIG. 23A.

In FIG. 23, the white circles denote pixel positions (Pi, Qi) on Line A or Line B at which a luminance correction value is calculated. The black circles denote a pixel position (Si) at which a luminance correction value is calculated on the Line J. In FIG. 23, the white triangles Q(Pi) denote positions on the Line B correlated to Pi using the correction table feature function described above. In FIG. 23, the white rhombuses denote interpolated values calculated from Pi and Q(Pi) on the Line J as positions internally divided by L1 and L2.

The value Q(Pi) corresponding to Pi and the correction value fb'(Pi) at that position are calculated. As shown in FIG. 19, a value gb(Q(Pi)) agreeing with the value ga(Pi) at Pi in the correction table feature function ga is obtained by firstly searching for pixel position at which $gb(k)<ga(Pi) \leq gb(k+1)$. The position k corresponds to Qi in FIG. 23A and the position internally dividing Qi and Qi+1 using a fractional part q0i of ga(Pi). Gb(Q(Pi)) is internally divided using Formula (33) below.

$$fb'(Pi)=gb(k) \times (1-q0i)+gb(k+1) \times q0i \quad (30)$$

In this manner, a correction value fa(Pi) that corrects Pi on Line A, and a correction value fb'(Pi) for a position Q(Pi) corresponding to Pi on Line B are obtained. A position Ri at which a line passing through Pi and Q(Pi) intersects with Line J and a correction value fj(Ri) at that position are calculated based on the position of the internal division of L1:L2 between Pi and Q(Pi).

$$Ri=(L1 \times Q(Pi)+L2 \times Pi)/(L1+L2) \quad (31)$$

$$fj(Ri)=(L1 \times fb'(Pi)+L2 \times fa(i))/(L1+L2) \quad (32)$$

Since the position Ri generally has a fractional part r0i, Ri is calculated in sequence for each value of Pi to obtain Rl which is the nearest to the left side and Rr which is the nearest to the right side of the pixel position Si on the Line J. fj(i) is calculated in Formula 33 below using the fractional part r0l and correction value fj(Rl) of Rl, and the fractional part r0r and correction value fj(Rr) of Rr.

$$fj(i)=r0r \times fj(Rl)+(1-r0l) \times fj(Rr) \quad (33)$$

While the sequence of calculating fj(i) from Pi is described herein, fj(i) can be calculated in sequence by calculating to the right from the left pixel position in the binding portion. In step S2202, when P(i,j) is not in the binding portion range, a step S2204 determines whether P(i,j) is in the front edge range. More precisely, a pixel is in a front edge range when the relationship $PELj \leq i \leq PERj$ is satisfied and in a step S2205, correction coefficient calculation as described hereafter is performed. When the pixel is not a front edge range pixel, the luminance coefficient is set to be a value of 1.0 times in step S2206 and the processing flow proceeds to correction value calculation of the next pixel position in a step S2207. In step S2208, when the calculation of the correction coefficient for all pixels on Line J is completed, the routine is terminated.

Figure 23B:
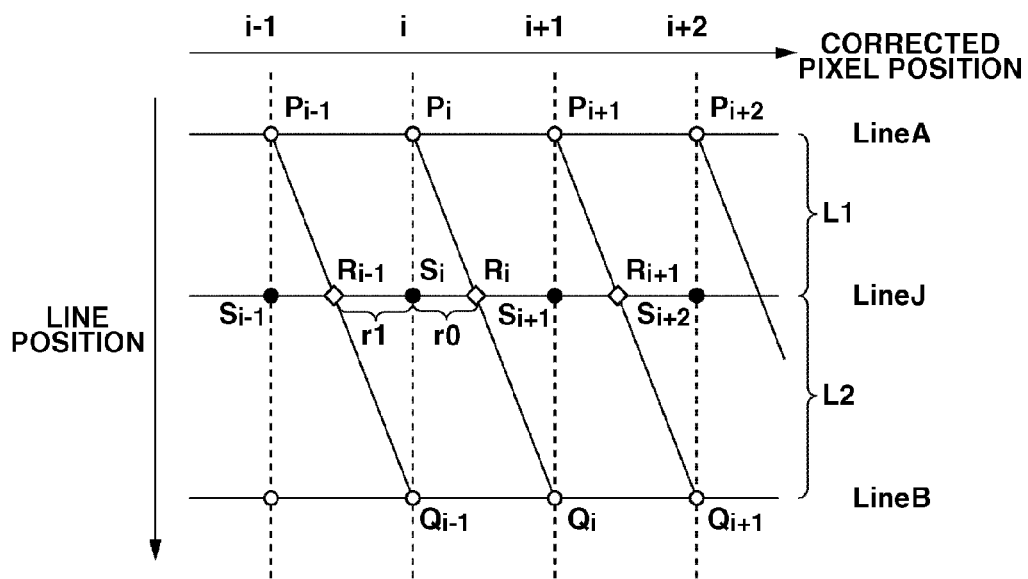

Next, a correction coefficient calculation for the front edge range will be described in detail making reference to FIG. 20 and FIG. 23B.

When a pixel position on the front edge end on Line A is denoted as Pa and a pixel position on the front edge end on Line B is denoted as Qa, Qi is related to Pi as shown in Equation (34).

$$Qi=Pi+(Qa-Pa) \quad (34)$$

The correction values are respectively fa(Pi) and fb(Qi). A position Ri at which a line passing through Pi and Qi intersects with Line J and a correction value fj(Ri) at that position are calculated based on the position of the internal division of L1:L2 between Pi and Qi.

$$Ri=(L1 \times Qi+L2 \times Pi)/(L1+L2) \quad (35)$$

$$fj(Ri)=(L1 \times fb(Qi)+L2 \times fa(i))/(L1+L2) \quad (36)$$

The position Ri generally has a fractional part r0i. The difference of the position Pi and the position Qi on the front edge is a fixed value of (Qa−Pa) and therefore r0 takes the same value in the same front edge range. A correction value of the pixel position Si on the left side of Ri on the Line J is obtained by a following Equation:

$$fj(i)=r0 \times fj(R(i-1))+(1-r0) \times fj(Ri) \quad (37)$$

Figure 25:
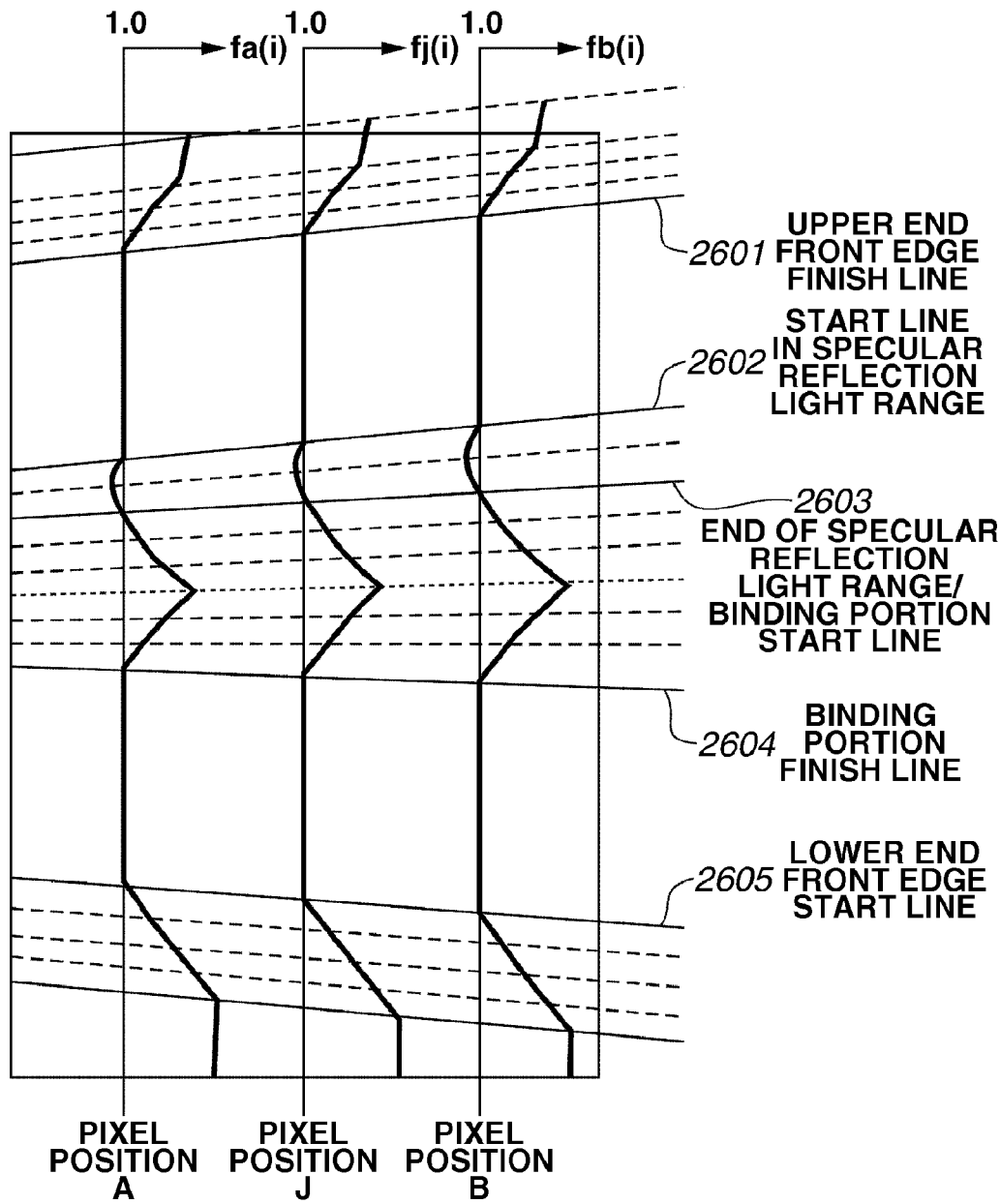
FIG. 25 illustrates the relationship between the luminance correction coefficient table fj(i) at the pixel position J and the detailed analysis results fa(i) and fb(i) calculated respectively in proximity to pixel position A and pixel position B, when the specular reflection range is in proximity to the binding portion shadow.

FIG. 25 illustrates the relationship between the luminance correction coefficient table fj(i) at the pixel position J and the detailed analysis results fa(i) and fb(i) calculated respectively in proximity to pixel position A and pixel position B, when the specular reflection range is in proximity to the binding portion shadow.

When specular reflection is present, a luminance correction coefficient table fj(i) at a pixel position j is calculated by separate calculation of correlation of fa(i) and fb(i) within the shadow range and specular reflection range. The shadow range has already been described in detail with reference to FIG. 19. The same method is applied to a table of inverses of correction values in the specular reflection range. After the calculation, its inverse is obtained and correction coefficients for the specular reflection range for the luminance correction coefficient table fj(i) are calculated.

In the above manner, a luminance correction coefficient table on a Line J or at a pixel position J can be calculated. When the calculation is performed on all lines in an image, luminance correction coefficients that appropriately correct shadow luminance and luminance resulting from neighboring specular reflection can be obtained as to all pixels in an image even in cases of extended binding portion shadow, inclined binding portion shadow, bright sections of specular reflection or front edge shadow.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-213363 filed Aug. 21, 2008, which is hereby incorporated by reference herein in its entirety.

What is claimed is:

1. An image processing apparatus comprising:
an input unit configured to input a read image which is obtained by reading of a book document by a sensor having a light receiving element which receives light reflected from the book document;
a specifying unit configured to specify in the read image a first area which is read with a larger amount of light reflected from the book document by the sensor than a second area in the read image; and
a processing unit configured to process data of the first area specified by the specifying unit in the read image, so that a luminance of the first area decreases.

2. The image processing apparatus according to claim 1, wherein the specifying unit specifies the first area based on an amount of variation in a luminance value in the read image.

3. The image processing apparatus according to claim 1, further comprising a determination unit configured to determine a direction, to the sensor, of a binding portion of a book document, in the read image input by the input unit.

4. The image processing apparatus according to claim 3, wherein the determination unit determines a shadow region in the read image based on the read image, and determines a direction of the binding portion based on the shadow region.

5. The image processing apparatus according to claim 3, wherein the specifying unit specifies the first area, if the direction determined by the determining unit is a predetermined direction.

6. The image processing apparatus according to claim 5, wherein the sensor is a line sensor and the determining unit determines a direction of a binding portion relative to the line sensor.

7. A method of image processing comprising:
inputting a read image which is obtained by reading of a book document by a sensor having a light receiving element which receives light reflected from the book document;
specifying in the read image a first area which is read with a larger amount of light reflected from the book document by the sensor than a second area in the read image; and
processing data of the first area specified by the specifying unit in the read image, so that a luminance of the first area decreases.

8. A non-transitory computer readable storage medium storing a program for causing a computer to perform an image processing method according to claim 7.

* * * * *